United States Patent
Schuster et al.

(10) Patent No.: US 11,504,632 B1
(45) Date of Patent: Nov. 22, 2022

(54) DYNAMIC ADJUSTMENT OF SHARD COUNT FOR PLAYER MATCHMAKING

(71) Applicant: Amazon Technologies, Inc., Seattle, WA (US)

(72) Inventors: Brian J Schuster, Seattle, WA (US); Bruce Erwin Brown, Burien, WA (US)

(73) Assignee: Amazon Technologies, Inc., Seattle, WA (US)

( * ) Notice: Subject to any disclaimer, the term of this patent is extended or adjusted under 35 U.S.C. 154(b) by 409 days.

(21) Appl. No.: 16/712,838

(22) Filed: Dec. 12, 2019

(51) Int. Cl.
| | |
|---|---|
| *H04L 67/10* | (2022.01) |
| *A63F 13/795* | (2014.01) |
| *G06F 9/455* | (2018.01) |
| *A63F 13/355* | (2014.01) |
| *G06F 16/9535* | (2019.01) |
| *A63F 13/358* | (2014.01) |
| *G06F 3/04847* | (2022.01) |

(52) U.S. Cl.
CPC .......... *A63F 13/795* (2014.09); *A63F 13/355* (2014.09); *A63F 13/358* (2014.09); *G06F 9/45558* (2013.01); *G06F 16/9535* (2019.01); *H04L 67/10* (2013.01); *G06F 3/04847* (2013.01); *G06F 2009/4557* (2013.01); *G06F 2009/45595* (2013.01)

(58) Field of Classification Search
CPC .... A63F 13/795; A63F 13/355; A63F 13/358; G06F 9/45558; G06F 16/9535; G06F 3/04847; G06F 2009/4557; G06F 2009/45595; H04L 67/10
See application file for complete search history.

(56) References Cited

U.S. PATENT DOCUMENTS

2021/0034627 A1* 2/2021 Mehta ................... G06F 16/285
2021/0191940 A1* 6/2021 Krishna ............ G06F 16/24545

* cited by examiner

*Primary Examiner* — Michael A Keller
(74) *Attorney, Agent, or Firm* — Lee & Hayes, P.C.

(57) ABSTRACT

A matchmaker (e.g., matchmaking software) may be implemented as a number of matchmaker shards, where each shard can potentially run on a different host within a service provider network. Disclosed herein are techniques and systems for dynamically adjusting a shard count associated with a given matchmaker of a subscriber during runtime, the shard count dictating a number of matchmaker shards used for assigning players to matches of a game. Adjustment of the shard count may be based on metrics that are usable to determine whether the current number of matchmaker shards is/are "overloaded", and, if so, the shard count can be increased, or whether the current number of matchmaker shards are "underloaded", and, if so, the shard count can be decreased.

20 Claims, 14 Drawing Sheets

DYNAMIC ADJUSTMENT OF SHARD COUNT FOR PLAYER MATCHMAKING

BACKGROUND

Service providers offer cloud-based services to fulfill users' computing-service needs without the users having to invest in and maintain computing infrastructure required to implement the services. These service providers may maintain networks of managed computing resources and functionality to implement various types of on-demand services, such as storage services, compute-power services, database-management services, networking services, and so forth. In this way, service providers maintain service provider networks that provide users with on-demand delivery of compute power, database storage, applications, and other resources, rather than the users having to make upfront investments in hardware and spend time and resources managing the hardware.

Often, users that subscribe to the service provider for use of computing resources in the service provider network also provide products or services to their own clients. For example, the service provider network may provide a game-hosting service to game developers that deploys, operates, and scales session-based game servers in the service provider network for clients of the game developers. In this way, a game developer that has developed an online game may host their session-based, online game using virtual machine (VM) instances running on servers of the service provider network that are accessible by players of the game.

The game-hosting service may also provide a matchmaking service to assign players to matches of an active or recently initiated game session. In some cases, the game developer may create its own customized matchmaking rules that are used by the matchmaking service to match players together for the developer's game. In order to ensure that players are placed into matches in a reasonable amount of time, matchmaking software (and the data used by the matchmaking software for matching players together) is often hosted on a single host computer (or "host") within the service provider network. This is sufficient when the rate of incoming matchmaking requests is relatively low, and when the matchmaking rules are relatively simple and straightforward. However, if a game developer creates complicated matchmaking rules, and/or if incoming traffic spikes to a higher-than-expected level, the processing needs of the matchmaking software used by the matchmaking service can quickly exceed the processing capacity of the single host on which it is executing. When this occurs, the queue of incoming requests may continue to grow if the incoming traffic does not subside, which results in players having to wait progressively longer wait times to be placed into a match of a game.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
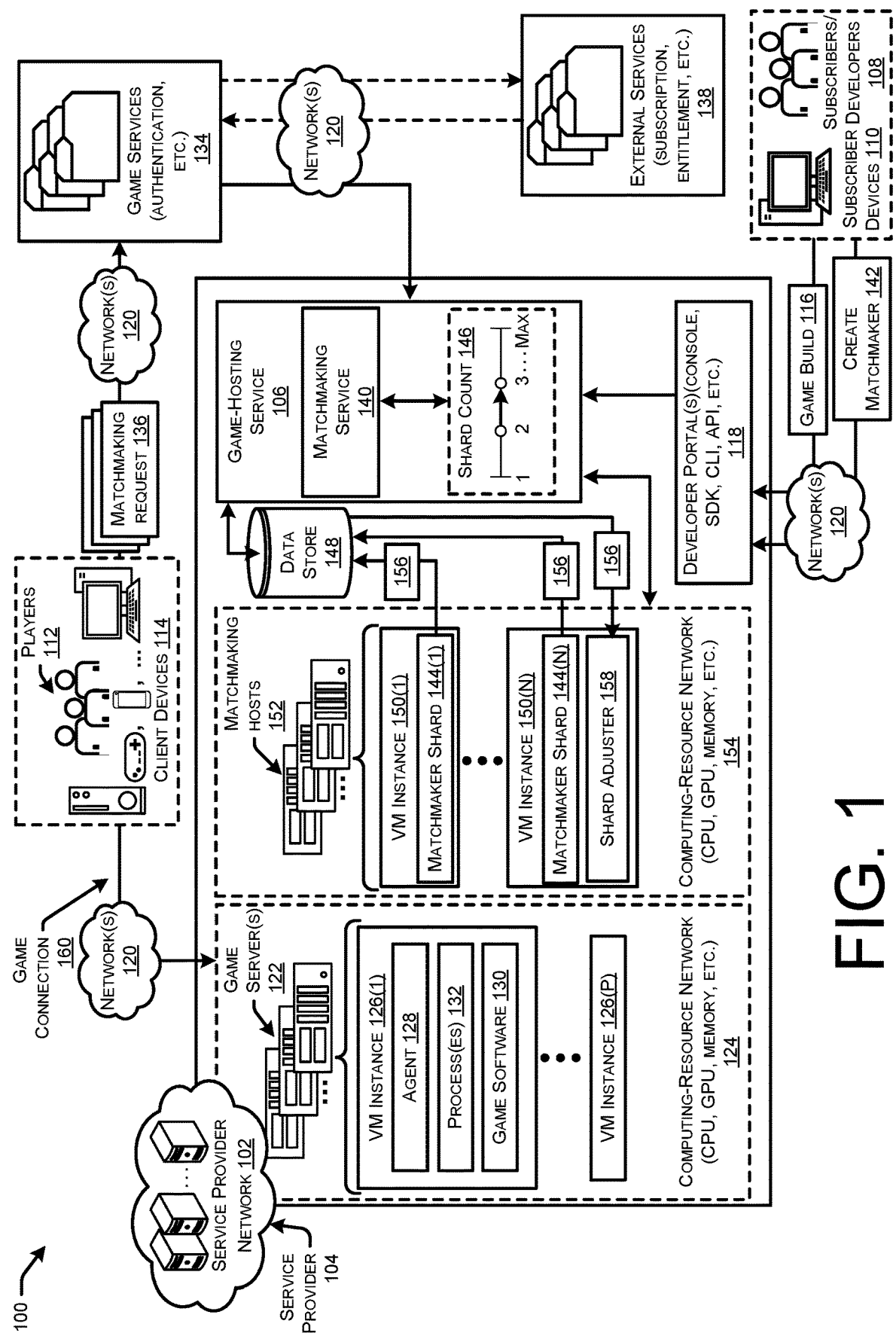
FIG. 1 illustrates a system-architecture diagram of an example environment in which a matchmaking service of a service provider network can dynamically adjust a shard count, which dictates a number of matchmaker shards used for assigning players to matches of a game. Each matchmaker shard is potentially executable on a different host.

Service providers offer various network-based (or "cloud-based") services to users to fulfill computing needs of the users. These service providers may operate service provider networks that include clusters of managed servers stored in data centers located across different geographic regions. In this way, users who have subscribed for use of the network-based services (or "subscribers") need not invest in and maintain the computing infrastructure required to implement the various services that they may need. Additionally, subscribers and their clients are able to access these network-based services over different geographic regions. To offer these network-based services across geographic areas, service providers operate and maintain service provider networks (e.g., cloud-based computing environments, network-based service architectures, network-based service infrastructures, etc.). In this way, service provider networks may provide subscribers with scalable, on-demand, and network-accessible computing platforms over large geographic regions such that the subscribers have readily-available VM instances at their disposal. These service provider networks allow subscribers to immediately have computing infrastructure over large geographic regions to fulfill individual computing needs of the subscriber, and also to provide computing resources to support services provided to clients of the subscribers.

For example, a subscriber to the service provider network may be a game developer (e.g., individual, company, and/or other organization) that has developed an online game that they would like to provide to clients who desire to play the online game. However, the game developer may desire to provide access to their online game to clients over large geographic regions, and for large amounts of players. The amount of computing infrastructure (e.g., compute power, memory, storage, networking, security, etc.) used to support and maintain an online gaming platform over different geographic regions that hosts game sessions for players may be large enough to be impractical for game developers, particularly new or emerging game developers, to purchase and maintain on their own.

Accordingly, service provider networks may provide a game-hosting service that is a fully, or at least partially, managed online gaming platform. The game-hosting service may deploy, operate, and scale session-based online game servers in the service provider network on behalf of game developers. The game-hosting service may provide groups, or "fleets," of virtual machine instances (e.g., VM instances, instances, etc.) that execute on computing resources of the service provider network and host game sessions for clients of a subscribing game developer. Game software included in a game build can be provisioned to a fleet of instances, and the game-hosting service may spin up the fleet of instances, where each instance in the fleet executes at least one process that is to host a game session. To establish or join a game session, players may utilize their client devices (e.g., applications, software, or other programs executing thereon) to request (e.g., via an application programming interface (API) call) that the game-hosting service create a game session.

To create a game session, a match is generally formed or made as an initial step, followed by a step of placing the match. The game developer may create its own customized matchmaker (e.g., matchmaking software) by specifying custom matchmaking rules that are to be used by the matchmaker to assign players to matches of the game. This customized matchmaker (and the data it uses) may be hosted in the service provider network and used to assign players to matches of the developer's game. If matchmaking software (and the data it uses for matching players together) resides on a single host computer (sometimes referred to herein as a "host") within the service provider network, the processing needs of the matchmaking software can quickly exceed the processing capacity of the single host on which it is executing. This may occur when matchmaking software (or "matchmaker") created by a developer includes complicated matchmaking rules, and/or if incoming traffic (e.g., a rate of incoming matchmaking requests) spikes to a higher-than-expected level. When the processing needs of the matchmaker exceed the processing capacity of the host, the queue of incoming matchmaking requests may continue to grow if the incoming traffic does not subside, which results in players having to wait progressively longer wait times to be placed into a match.

This disclosure describes, among other things, techniques and systems implemented by a game-hosting service of a service provider network to allow a matchmaker (e.g., matchmaking software, sometimes called a "matchmaker configuration") to be implemented as a number of matchmaker shards, where each shard can potentially run on a different host within the service provider network. In this manner, the matchmaker can, at times, be run in a distributed manner (via multiple shards) across multiple hosts. Also disclosed herein are techniques and systems for dynamically adjusting (i.e., increasing or decreasing) a shard count associated with a given matchmaker of a subscriber during runtime (e.g., adjusting the shard count while new players continue to request placement into matches of a game).

A "matchmaker shard" (or "shard"), as used herein, means executable software that is tasked with determining match assignments for a designated allotment of players associated with queued matchmaking requests. For example, if the shard count is set to one shard, a single matchmaker shard may execute on a VM instance of a host, and that single matchmaker shard works with the entire player population that has requested to be, but has not yet been, placed into matches of a game. When the shard count is increased to more than one shard, multiple matchmaker shards may execute on multiple VM instances that are potentially executing on a multiple different hosts. Distributing matchmaker shards across multiple hosts, on demand, can help ensure that there is sufficient processing capacity to accommodate a spike in the rate of incoming matchmaking requests and/or to accommodate running a matchmaker algorithm that is based on complicated, processing-intensive matchmaking rules, and the like.

In an illustrative example, if the shard count is set to two shards, a first matchmaker shard may execute on a first VM instance of a first host, and a second matchmaker shard may execute on a second VM instance of a second host, and each matchmaker shard may execute a common matchmaker algorithm for assigning its own designated allotment of players to matches of the game. For instance, the first matchmaker shard may execute the matchmaker algorithm on a first subset of players (e.g., roughly 50% of the entire player population that has requested to be placed into matches), and the second matchmaker shard may execute the matchmaker algorithm on a second subset of the players (e.g., roughly 50% of the entire player population).

Adjustment of the shard count may be based on metrics (e.g., measured parameters, statistics, etc.) that are reported by the individual matchmaker shard(s) as a result of executing a matchmaker algorithm to assign players to matches of a game. An example metric that is usable for determining whether to increase the shard count is a "maximum wait time metric." To illustrate, an individual matchmaker shard may be allotted at least a portion of the queued matchmaking requests, and may be tasked with assigning players associated with those requests to matches of a game by executing a matchmaker algorithm. In this context, the matchmaker shard may compute, for an individual matchmaking request, a time period between a first time at which the matchmaking request was queued and a second time at which the matchmaker shard started executing the matchmaker algorithm to assign a player(s) associated with the matchmaking request to a match of the game. This computed time period is referred to herein as a "wait time" for that player. During a reporting period, the wait times computed for the individual matchmaking requests can be evaluated to determine a maximum wait time amongst the set of computed wait times, and this maximum wait time can be evaluated to determine whether or not to increase the shard count. In one example, a threshold wait time can be used. That is, the shard count may be increased if the maximum wait time violates (e.g., is greater than or equal to, or is strictly greater than) the threshold wait time. In some embodiments, the shard count may be increased if individual maximum wait times of multiple maximum wait times reported by a matchmaker shard over a predetermined period of time violates the threshold wait time. That is, if the reported maximum wait times violate the threshold wait time for a threshold amount of time, the shard count may be increased a bit more cautiously. Thus, the maximum wait time metric is usable to determine whether the current number of matchmaker shards is/are "overloaded", and, if so, the shard count can be increased.

An example metric that is usable for determining whether to decrease the shard count is an "algorithm utilization metric." To illustrate, an individual matchmaker shard with an allotment of at least a portion of the queued matchmaking requests may execute the matchmaker algorithm to assign the players associated with those requests to matches of the game, and then the shard may wait for a short period of time (e.g., 250 milliseconds, 200 milliseconds, etc.) while additional matchmaking requests are queued, and may repeat the execution of the matchmaker algorithm for this next batch of queued requests. At a suitable reporting interval, the matchmaker shard may sum multiple time periods measured from starting the execution of the matchmaker algorithm to stopping the execution of the matchmaker algorithm in order to compute a total run time of the matchmaker algorithm. This total run time can then be divided by the elapsed wall-clock time measured from the start of the first run of the matchmaker algorithm to the end of the last run of the matchmaker algorithm. This results in a percentage of a period of time that the matchmaker shard spent executing the matchmaker algorithm to assign its allotment(s) of players to matches of the game, and this percentage (called the "algorithm utilization metric") can be evaluated to determine whether or not to decrease the shard count. In one example, a threshold percentage can be used. That is, the shard count may be decreased if the algorithm utilization metric (e.g., a percentage value) fails to violate (e.g., is less than or equal to, or is strictly less than) the threshold percentage. Thus, the algorithm utilization metric is usable to determine whether the current number of matchmaker shards are "underloaded", and, if so, the shard count can be decreased.

Adjusting the shard count up or down in this manner allows for striking a balance between ensuring that adequate computing resources are available for placing players into matches within a reasonable amount of time, and also ensuring that the player population is not overly fragmented. That is, partitioning the player population amongst matchmaker shards provides benefits of reducing the wait time for players to be placed into matches because the matchmaking workload can be potentially distributed across multiple hosts, thereby providing adequate resources to meet or exceed the demand of the matchmaker algorithm. However, if too many shards are implemented for a given matchmaker, the player population may become overly-fragmented, and the match quality may not be as good as it could be with a less-fragmented player population. To illustrate, consider an example where a matchmaker is implemented across 10,000 matchmaker shards. This number of shards may ensure that players can be placed into matches quickly for many use cases, but this also means that the player population will be divided into 10,000 subsets of players, and each matchmaker shard works with its own subset of players to find matches exclusively for those players. In this example, if a first player is in one subset allocated to a first shard, and if the matchmaking algorithm would otherwise place the first player into a match with a second player who is in another subset allocated to a second shard, these players may not be provided with optimized match quality because players allocated to different matchmaker shards may not be matched together. Thus, it may be beneficial to set the shard count to a number that is as low as possible, while trying to set the shard count to a number that that is high enough to provide sufficient processing resources for placing players into matches within a reasonable (e.g., below threshold) amount of time. In some embodiments, the dynamic adjustment of the shard count may bias towards a preference of having more processing capacity at the cost of having more-fragmented player populations. Said another way, it may be better to have sufficient capacity for matchmaking so that wait times are reduced, possibly at the expense of having an overly-fragmented player population for a short time. This may translate into an implementation that more liberally increases the shard count, and more conservatively decreases the shard count.

An example process for increasing a shard count may include executing, by one or more computing devices of a service provider network, a first number of matchmaker shards on one or more VM instances allocated to a subscriber of the service provider network. This first number of matchmaker shards may include at least a first matchmaker shard executing on a first VM instance of a first host computer. The process may determine a metric associated with queued matchmaking requests associated with a plurality of players of a game associated with the subscriber, where the metric indicates whether one or more matchmaker shards of the first number of matchmaker shards are overloaded. Based at least in part on the metric, a shard count associated with the subscriber may be increased from the first number to a second number greater than the first number. With the shard count increased to the second number, the one or more computing devices may execute the second number of matchmaker shards on of the one or more VM instances allocated to the subscriber, wherein the second number of matchmaker shards includes at least the first matchmaker shard executing on the first VM instance of the first host computer and a second matchmaker shard executing on at least one of the first VM instance, a second VM instance of the first host computer, or a third VM instance of a second host computer.

An example process for decreasing a shard count may include executing, by one or more computing devices of a service provider network, a first number of matchmaker shards on one or more VM instances allocated to a subscriber of the service provider network. This first number of matchmaker shards may be configured to assign players to matches of a game associated with the subscriber, and may include at least a first matchmaker shard executing on a first VM instance of a first host computer and a second matchmaker shard executing on at least one of the first VM instance, a second VM instance of the first host computer, or a third VM instance of a second host computer. The process may determine a first metric that indicates whether the first matchmaker shard is underloaded, and may determine a second metric that indicates whether the second matchmaker shard is underloaded. Based at least in part on at least one of the first metric or the second metric, a shard count associated with the subscriber may be decreased from the first number to a second number less than the first number. With the shard count decreased to the second number, the one or more computing devices may execute the second number of matchmaker shards on the one or more VM instances allocated to the subscriber, which may include executing a first matchmaker shard on the first VM instance of the first host computer.

By dynamically adjusting the shard count—which dictates the number of matchmaker shards that are deployed at any given time, a matchmaking service can determine, based at least in part on observed metrics that indicate whether the matchmaker shards are presently overloaded or presently underloaded, when, and/or how fast, and/or by how much to adjust the shard count. This helps ensure that players are not waiting longer than a threshold amount of time to be placed into matches, while also mitigating the effects of fragmenting the player population amongst multiple shards.

While some of the techniques are described herein as being performed in a service provider network of a service provider, the techniques may similarly be applied in other computing networks, such as on-premise servers managed by the game developers themselves. Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an example environment 100 in which a matchmaking service of a service provider network 102 can dynamically adjust a shard count, which dictates a number of matchmaker shards used for assigning players to matches of a game. Each matchmaker shard is potentially executable on a different host.

As illustrated, the service provider network 102 may be operated and/or managed by a service provider 104. The service provider network 102 may provide various services to users to fulfill their computing resource needs, such as cloud-based computing resources. For example, the service provider network 102 may provide cloud-based, scalable, and network accessible compute power services, storage services, database services, and/or other services. As illustrated, the service provider network 102 may also provide a game-hosting service 106 that is a scalable, cloud-based runtime environment for online games, including session-based multiplayer games. The game-hosting service 106 may be fully managed by the service provider 104 and may deploy, operate, and scale the session-based multiplayer game servers in the cloud-based, or network-based, environment. For example, the game-hosting service 106 may not only provide the hardware to host the game sessions, but also manage ongoing activity, security, storage, and performance tracking. Additionally, the game-hosting service 106 may provide auto-scaling capabilities such that instances supporting game sessions can be spun up or spun down based on player demand.

To utilize the game-hosting service 106, subscribers 108 (who may also be "game developers", or "developers" 108) may utilize subscriber devices 110 to register for an account (e.g., a user account, subscriber account, etc.) with the game-hosting service 106. This may allow the subscribers 108 to subscribe to the game-hosting service 106, provide a game build(s) for their online game(s), create a matchmaker(s) with customized matchmaking rules, and to provide their clients (denoted as "players 112" in FIG. 1, because the clients may, at times, be engaged in playing a game) with access to the online game(s) via their client devices 114 without the subscribers 108 having to invest in the computing resources (e.g., on-premise resources) needed to host the online game sessions for their players 112. In order to utilize the game-hosting service 106, the subscribers 108 may provide a game build 116 to the game-hosting service 106 via one or more developer portals 118. The developer portal(s) 118 may include one or more of a web-based console, a software-development kit (SDK), a command-line interface (CLI), an application programming interface(s) (API), and/or any other means by which a subscriber 108 may specify and/or provide a game build 116 to the game-hosting service 106, and/or provide a request to create a customized matchmaker (described in more detail below).

The game build 116 may correspond to any type of online game that may host a game session for one or more players 112. For instance, the game build 116 may correspond to a session-based single player online game, or a session-based multiplayer online game. In this disclosure, which describes techniques and systems relating to matchmaking, the game build 116 may correspond to a session-based multiplayer online game where players 112 are grouped together in matches to play the game. The game build 116 may represent any type of online game, such as real-time strategy (RTS) games, first person shooter (FPS) games, multiplayer online battle arena (MOBA) games, role playing (RPG) games, massively multiplayer online (MMO) games, massively multiplayer online role player games (MMORPG), virtual board games (e.g., chess, checkers, etc.), action-adventure games, simulation games, strategy games, sports games, virtual reality games, and/or any other game that may be played in an online environment.

Generally, the client devices 114 may comprise any type of computing device that may be utilized for online gaming. For instance, the client devices 114 may include laptop computing devices, desktop computing devices, mobile phones, tablets, gaming systems, controller-based devices, virtual and/or augmented reality devices (e.g., head-mounted displays (HMDs)), other wearable devices, biometric sensors, projectors, televisions, and/or any computing device usable on its own, or in conjunction with other devices, for online gaming. In some examples, at least part of the online game may execute and/or be stored locally on the client devices 114. Furthermore, the subscriber devices 110 may comprise any type of computing device that may be utilized to access the service provider network 102. For instance, the subscriber devices 110 may include, without limitation, laptop computers, desktop computers, tablet computers, server computers, mobile phones (e.g., smartphones), gaming systems (e.g., game consoles), televisions, and/or any computing device usable on its own, or in conjunction with other devices, for accessing the service provider network 102.

The game build 116 may include the game software for the online game, and may further include server executables, supporting assets, libraries, and dependencies that are used to host and/or execute the game software on an instance. The subscribers 108 may provide the game build 116 through the developer portal(s) 118, such as by uploading the game build 116 over one or more networks 120 (e.g., the Internet, wireless wide area networks (WANs), personal area networks (PANs), wired and/or wireless local area networks (LANs), etc.). The network(s) 120 may comprise any type of network or combination of network, including wired and/or wireless networks. Once a subscriber 108 has uploaded their game build 116, the game-hosting service 106 may deploy the game software to one or more game servers 122 in a computing-resource network 124. For instance, the game software corresponding to the game build 116 may be installed on one or more virtual machine (VM) instances 126 that are at least partially managed by a local agent 128 (e.g., script, program, application, etc.).

The computing-resource network 124 may include data centers that each include one or more computing resources, such as VM instances 126(1)-(P), where "P" is any integer (referred to herein collectively as "VM instances 126" "or just "instances 126"). The data centers may house the game server(s) 122 and may be located across disparate geographical regions such that computing resources are available to support functionality for cloud-based services provided by the service provider network 102. The computing resources may include various combinations of hardware-based components, such as central processing units (CPU), graphics processing units (GPU), memory, storage, network capacity, security, and/or any other type of hardware-based resource to support cloud-based services, such as the game-hosting service 106. In some examples, the computing resource network 124 may further include respective memories that store various firmware-based and/or software-based resources that provide the functionality of the services, such as the instances 126 on which an agent 128 executes, the game software 130 executes, and one or more processes 132 execute to support a game session.

Generally, the agent 128 may be responsible for handling various processes on an instance 126, such as spinning up an instance 126, spinning down an instance 126, handling lifetime processes of the instance 126, retrieving game session assignments for processes 132 executing on the instance 126, executing processes 132 on the instance 126 to host a game session, managing resources of the instance 126, installing patches and/or other software on the instance 126 and/or various other actions for managing the instance 126. A game session is an instance of the game software 130 running on a server that players 112 can connect to and interact with. The game defines the basic characteristics of the game session, such as the life span or the number of players 112 involved. The process(es) 132 may be binary processes 132, executable processes 132, etc., running on the VM instance 126 that consume or utilize the underlying hardware resources and/or other resources.

To play in a game session, the client devices 114 may interact directly with the game-hosting service 106, and/or through various backend game services to retrieve information on current game sessions, to request new game sessions, and/or reserve slots in game sessions. For instance, the client devices 114 may interact, over one or more networks 120, with game services 134 that may handle communication between client devices 114 and the game-hosting service 106. Further, the game services 134 may handle additional tasks or provide additional services, such as player authentication and authorizations, team building, and inventory control. For example, when a player 112 wants to start a new game, the client device 114 may call the authentication service to first verify the player's 112 identity, and then send a matchmaking request 136 to the game-hosting service 106. It is to be appreciated that, although the game services 134 may receive matchmaking requests 136 and route the requests 136 to the game hosting service 106, and although the game services 134 may handle some matchmaking tasks itself, this disclosure contemplates that matchmaking tasks are handled by the game-hosting service 106 of the service provider network 102, and, as such, matchmaking requests 136 can be submitted from the client devices 114 directly to the game hosting service 106 over the network(s) 120, without being routed through the game services 134, in some embodiments.

In further examples, the online game of a subscriber 108 may rely on or utilize one or more additional external services 138, such as for validating a subscription membership and/or determining entitlements for a client's account. As shown, the information from the external services 138 may be passed to the game server(s) 122 via the game services 134 and the game-hosting service 106 without going through the client device(s) 114.

To establish or join a game session, players 112 may utilize their client devices 114 (e.g., applications, software, or other programs executing thereon) to request 136 (e.g., via an API call) that the game-hosting service 106 place them into a match of a game session for a game. For example, to create a game session for a multiplayer game, a match is generally formed or made as an initial step, followed by a step of placing the match. For example, if a player(s) 112 connects to the game services 134 (or connects directly to the game hosting service 106 without connecting to the game services 134) over the network 120 for playing a multiplayer game, a "StartMatchmaking" API call can be submitted, along with identifiers of the player(s) 112 who would like to be placed in a match for playing an online video game.

The game hosting service 106 may implement a matchmaking service 140 to handle the matchmaking requests 136 (sometimes referred to herein as "tickets" 136) by assigning players associated with the tickets 136 into matches of a game using a matchmaker (e.g., matchmaking software) associated with the subscriber 108 who developed the game. For example, a subscriber 108 can creates a new matchmaker (or matchmaker configuration) via a request sent to the game hosting service 106, which is shown in FIG. 1 as a "create matchmaker" request 142. As part of this create matchmaker request 142, the subscriber 108 may configure customized matchmaking rules using a customizable rules engine that allows subscriber 108 to design how to match players 112 together based on player attributes, game modes, skill level, geographic regions, etc. These matchmaking rules are to be adhered to when matching players 112 together into matches. These matchmaking rules can be based on any suitable factors, such as, without limitation, skill level of the players 112, amount of time the players 112 have been waiting to be placed into a match, geographic regions of the players 112, social connections amongst the players 112, player preferences for particular game attributes or features (e.g., maps, weapons, etc.), and/or other factors. In an illustrative example, the subscriber 108 may create a matchmaking rule that indicates the matchmaker algorithm should only consider matching players together whose client devices 114 have a latency less than 50 milliseconds. Another example matchmaking rule may specify that players 112 with skill levels that are different by more than a threshold difference (e.g., more than 15 points different) should not be grouped together in a match. As yet another example, the subscriber 108 may configure a matchmaker with a matchmaking rule that biases toward matching players 112 together if they have a preference for the same particular game map among a plurality of game maps that can be used in the game. These are merely example matchmaking rules, and other types of rules known to a person having ordinary skill in the art can be implemented.

As mentioned, a matchmaker (e.g., matchmaking software) may be deployed as a number of matchmaker shards 144(1)-(N) (referred to herein collectively as "matchmaker shards 144" "or just "shards 144"). An adjustable shard count 146 is usable to set the number of matchmaker shards 144 at any number over a range of integers from a minimum number (e.g., one shard) to a maximum number. In FIG. 1, "N" represents the current number of shards 144 deployed, which is equal to the current shard count 146. When a subscriber 108 creates a new matchmaker (via a create matchmaker request 142) with customized matchmaking rules, the matchmaking service 140 may consult an override table maintained in a data store 148 to determine a maximum shard value, Max, from the override table for the given subscriber 108, and the matchmaking service 140 may copy the maximum shard value, Max, to the subscriber's 108 settings for that newly-created matchmaker to indicate the maximum number, Max, of shards to which the shard count 146 is adjustable for that matchmaker. In addition, the current shard count 146 may be initialized at any suitable initial number from the minimum number (e.g., one shard) to the maximum number, Max. In some embodiments, the initial number of shards 144 may be set to the minimum number. For example, if the minimum number to which the shard count 146 is adjustable equals one shard, the shard count 146 may be initialized to one shard. With the shard count 146 set to an initial number, that initial number of matchmaker shards 144 may be assigned to a given VM instance(s) 150 executing on a matchmaking host(s) 152 (sometimes referred to as "host computer" 150, or simply "host" 150) in a computing-resource network 154, which may be the same as, or similar to, the computing-resource network 124 described above. Each matchmaker shard 144 may include the matchmaking software for assigning players 112 to matches of a game in accordance with one or more matchmaking rules, and may further include server executables, supporting assets, libraries, and dependencies that are used to host and/or execute the matchmaker shard 144 on an instance 150.

The computing-resource network 154 may include data centers that each include one or more computing resources, such as VM instances 150(1)-(N) (referred to collectively as "VM instances 150" "or just "instances 150"). Although FIG. 1 shows a one-to-one correspondence of shards 144 to instances 150, there may be a many-to-one correspondence of shards 144 to instances 150, in some embodiments, such as when a single VM instance 150 is sufficient for executing multiple matchmaker shards 144. The data centers of the computing-resource network 154 may house the host computers 152 and may be located across disparate geographical regions such that computing resources are available to support functionality for cloud-based services provided by the service provider network 102. The computing resources may include various combinations of hardware-based components, such as CPU, GPU, memory, storage, network capacity, security, and/or any other type of hardware-based resource to support cloud-based services, such as the matchmaking service 140. In some examples, the computing resource network 154 may further include respective memories that store various firmware-based and/or software-based resources that provide the functionality of the services, such as the instances 150 on which the matchmaker shards 144 execute.

The assignment of an individual matchmaker shard 144 to a VM instance 150 of a given host 152 may be carried out by a "load balancing node." In some embodiments, one of the VM instances 150 may be designated as this load balancing node using a system of distributed locks. Consider an example where the VM instance 150(N) is designated as the load balancing node. This designation may be made by the VM instance 150(N) claiming ownership of (or acquiring) a particular lock. With this particular lock acquired, the VM instance 150(N) may determine, or select, the most appropriate VM instance 150 and/or host 152 to which an individual matchmaker shard 144 should be assigned. The selection of the most appropriate VM instance 150 and/or host 152 to host the matchmaker shard 144 may be based on various factors including, without limitation, a current capacity of the host 152 and/or the current capacity of the VM instance 150, whether the VM instance 150 is in charge of other tasks, such as reading metrics reported by other shards 144 for determining whether to adjust the shard count 146, etc. The assigned VM instance 150 selected by the load balancing node (e.g., the instance 150(N)) may then obtain or acquire a lock that is associated with (or specific to) the matchmaker shard 144 in order to secure ownership of the matchmaker shard 144, and this information may be written to a lock table maintained in the data store 148. The lock for a given matchmaker shard 144 may be keyed on a shard identifier (ID), which may be a function of the subscriber's 108 account ID and/or a matchmaking configuration name. The use of the load balancing node for assigning matchmaker shards 144 to VM instances 150 executing on particular hosts 152 prevents a single host 152 from "owning" (e.g., by its VM instance(s) 150 acquiring locks for) a large number of matchmaker shards 144, and/or owning a number of computationally-expensive shards 144, while other hosts 152 and their VM instances 150 remain relatively idle. The load balancing node may be configured to, at one or more different times (e.g., periodically, in response to the occurrence of an event, etc.) after an initial assignment, analyze the factors it uses for assigning shards 144 to VM instances 150 and/or hosts 152, and determine whether any shards 144 can be redistributed/reassigned to other VM instances 150 and/or hosts 152 to provide an improved balance of shards across VM instances 150 and/or hosts 152.

At runtime, the matchmaking service 140 may read the current shard count 146 for a given matchmaker from a record in the data store 148 associated with the given matchmaker. If the shard count 146 happens to be missing from the record in the data store 148, the shard count 146 may be assumed to be equal a minimum number (e.g., one shard) of an adjustable range. The matchmaking service 140 may determine the lock to use, such as by computing a hash value based on the ticket identifier (ID) of an incoming ticket 136 and/or the current shard count 146. The lock name for each shard 144 may include the matchmaker shard 144 or an identifier thereof. A shard count 146 of zero ("0") may have logic which does not include the matchmaker shard 144 in the lock name for backward compatibility with systems that do not implement matchmakers as a number of matchmaker shards 144. It is to be appreciated that a subscriber 108 may create multiple matchmakers, each implemented as a number of matchmaker shards 144 that can potentially be set to a number greater than one, and where each shard 144 can potentially execute on a different host 152. In this scenario, each matchmaker associated with the subscriber 108 may have a shard count 146 associated therewith, which is adjustable up to the same maximum number, Max, and down to the same minimum number (e.g., one shard).

The shard ID of the matchmaker shard 144 for which the request 136 is to be queued may be stored with the request 136 to enable routing of the request 136 to the correct host 152 executing the VM instance 150 that acquired the lock for the matchmaker shard 144. When a player 112 submits a matchmaking request 136, a shard ID may be passed in with the request 136 to access the appropriate matchmaker shard 144 and the corresponding lock for the shard 144. The matchmaking service 140 may consult (e.g., read) the lock table in the data store 148 to identify which VM instance 150 owns the matchmaker shard 144 associated with the request 136. The matchmaking service 140 may then make a call to either the lock-owning VM instance 150 of a particular host 152, or, if the lock is unowned, to the load balancing node (e.g., the instance 150(N)) for real-time assignment of the matchmaker shard 144 to an appropriate VM instance 150 of a host 152.

In general, a single request 136 may be associated with a single player 112, or with multiple players 112. The incoming requests 136 are received, and the requests 136 are distributed to the matchmaker shards 144 in order to distribute the players 112 amongst the matchmaker shards 144. This can be done randomly, in some embodiments. For example, if the shard count 146 is set to two, two shards 144(1) and 144(2) may be allocated roughly half of the players 112 (randomly-selected) associated with a subset of the incoming requests 136, and the subset of requests 136 may be queued (e.g., placed into a logical container) for each shard 144. This may be accomplished by placing the respective subsets of requests 136 into respective queues (e.g., logical containers) associated with each matchmaker shard 144. If the shard count 146 is currently set to one shard, all of the requests 136 may be queued for the single matchmaker shard 144.

In some embodiments, distributing the incoming requests 136 amongst the shards 144 may not be random. For example, allocating requests 136 to shards 144 may be based on a time of receipt (e.g., a first received request 136 may be queued for a first shard 144(1), a next received request 136 may be queued for a second shard 144(2), and so on and so forth, much like dealing cards to players of a card game). In some embodiments, other logic for distributing requests 136 amongst shards 144 may be utilized, such as exposing a partitioning key to the subscriber 108 that is used to assign partitioning key values to its players 112, and players 112 with the same value of the partitioning key may be queued together for one shard 144(1), while other players 112 with a different common value of the partitioning key may be queued together for another shard 144(2), and so on and so forth. As yet another example, a machine learning model(s) may receive the requests 136 as input and may output shard assignments based on various features, such as any suitable player attribute(s). In other words, the matchmaker service 140 may implement some pre-matchmaking logic to partition the player population amongst shards in a way that is perhaps better-than-random, but not as robustly as the matchmaking logic implemented by the individual matchmaking shards 144 for matching players 112 together in matches of the game.

The VM instance 150 running a matchmaker shard 144 may verify that it owns the correct matchmaker shard 144 for the requests 136 that have been queued for the matchmaker shard 144 it is hosting. This may be accomplished by checking the lock table in the data store 148 to verify ownership of the correct matchmaker shard 144. Assuming the respective VM instances 150 owns the correct matchmaker shard 144 for which the requests 136 are being queued, each matchmaker shard 144 is tasked with "finding a match" for the players 112 associated with the requests 136 that have been allotted to the shard 144. To do this, the matchmaker shard 144 may implement a matchmaker algorithm that is common across all shards 144 for a given matchmaker. Accordingly, an individual matchmaker shard 144 may periodically "work on" its own queued requests 136 by executing a matchmaker algorithm to assign the players 112 associated with the queued requests 136 to matches of a game. Each time the matchmaker algorithm is executed, the algorithm may start and stop for a given set of queued matchmaking requests 136 over a period of time (e.g., a period of roughly a minute). The process of running the algorithm may include determining the players 112 associated with the allotted requests 136 that have been queued for the shard 144, starting execution of the matchmaker algorithm to assign the determined players 112 to matches of the game, stopping execution of the matchmaker algorithm, and then waiting a short period of time (e.g., 250 milliseconds, 200 milliseconds, etc.) to allow for some settling of incoming requests 136 as they are queued, and then repeating these steps for the next set of queued requests 136 that are allotted to the matchmaker shard 144.

As this matchmaking process is going on, the individual matchmaker shards 144 may report metrics 156 at a reporting interval (e.g., every 15 seconds). These reported metrics 156 may be stored in (e.g., written to a table in) the data store 148. The data store 148 (e.g., object storage) may represent one or more data stores that stores various data described herein at one or more locations in the service provider network 102. The data store 148 may track matchmaker shards 144. Records for these shards 144 may include additional data/metadata (e.g., locks) including, without limitation, an owner (e.g., whether the shard 144 is not assigned to an owner, or assigned to VM instance 150 and/or host 152), identifiers of VM instance 126/150, locks owned by the instances 126/150, fleet, subscriber 108, etc. The data store 148 may further include the game builds 116 for developers 108 that include game software 130. The data store 148 may further store data for the shard count 146 that indicates minimum numbers, maximum numbers, current values to which the shard count 146 for a given matchmaker is, or can be, set. The data store 148 may further store the metrics 156 described herein, such as a metric indicating whether one or more shards 144 are overloaded (e.g., the maximum wait time metric), a metric indicating whether one or more shards 144 are underloaded (e.g., the algorithm utilization metric), and possibly additional metrics. The data store 148 may further store queues in which matchmaking requests 136 (or tickets 136) are queued for assigning players 112 to matches. The data store 148 may further store user accounts for the players 112 and/or subscribers 108, and subscriber parameter values, which, as explained in further detail below, may dictate the thresholds and other logic used by the shard adjuster 158 for a given matchmaker of a given subscriber 108. Much of the data can be updated at any suitable time by the service provider 104 and/or the subscriber 108.

A VM instance 150(N) designated as a "leader" VM instance 150 may periodically read the metrics 156 from the data store 148 and determine, using a shard adjuster 158, whether to adjust the shard count 146 for the matchmaker represented by the current number of matchmaker shards 144. The metrics 156 may include any suitable metrics that generally indicate, or are usable to determine, whether the matchmaker shards 144 are presently overloaded or presently underloaded. An example metric 156 that is usable for determining whether to increase the shard count 146 is a "maximum wait time metric." To illustrate, an individual matchmaker shard 144, say shard 144(1) in FIG. 1, may be allotted at least a portion of the queued matchmaking requests 136, and may be tasked with assigning players 112 associated with those requests 136 to matches of a game by executing a matchmaker algorithm. In this context, the matchmaker shard 144(1) may compute, for an individual matchmaking request 136, a time period between a first time at which the matchmaking request 136 was queued (e.g., in a queue for the shard 144(1)) and a second time at which the matchmaker shard 144(1) started executing the matchmaker algorithm to assign a player(s) 112 associated with the matchmaking request 136 to a match of the game (i.e., a second time when the algorithm first considers the player for a potential match). This computed time period is referred to herein as a "wait time" for the player(s) 112. At the end of a reporting interval, the wait times for individual ones of a plurality of requests 136 can be evaluated (e.g., compared against one another) to determine a maximum wait time among the set of computed wait times, and this maximum wait time can be evaluated by the shard adjuster 158 to determine whether or not to increase the shard count 146. In one example, a threshold wait time can be used. That is, the shard count 146 may be increased if the maximum wait time violates (e.g., is greater than or equal to, or is strictly greater than) the threshold wait time. The threshold wait time may be set to any suitable value that is deemed acceptable for players 112 to wait to be placed into matches, and this threshold wait time may be adjustable by the subscriber 108 for the subscriber's 108 own players 112. In some embodiments, the shard count 146 may be increased if individual maximum wait times of multiple maximum wait times reported by a matchmaker shard 144 over a predetermined period of time (e.g., a period that spans multiple reporting intervals) violates the threshold wait time. For example, if each of the multiple maximum wait times reported over a predetermined (or threshold) period of time violates the threshold wait time, the reported maximum wait times have violated the threshold wait time for a threshold amount of time (e.g., a minute), and the shard count 146 may be increased. Said differently, if the maximum wait time metric is elevated above the threshold wait time for a period of time, the current number of matchmaker shards 144 may be considered to be "overloaded", and, in this case, the shard count 146 can be increased.

In some embodiments, the individual matchmaker shards 144 can be tagged for up-sharding (e.g., tagging the shard 144 with a designated tag) based on the maximum wait time(s) reported by the shard 144, and then, if and when a threshold number or percentage of shards 144 are tagged for up-sharding, the shard adjuster 158 may determine to increase the shard count 146. For example, if at least 50% of the shards 144 have been tagged for up-sharding, the shard count 146 may be increased. However, in some embodiments, if any shard 144 is overloaded (e.g., if the maximum wait time violates the threshold wait time for more than a predetermined period of time), the shard count 146 may be increased. This provides a more liberal approach to increasing the shard count 146, as opposed to waiting for multiple shards 144 to be overloaded before increasing the shard count 146.

An example metric 156 that is usable for determining whether to decrease the shard count 146 is an "algorithm utilization metric." To illustrate, an individual matchmaker shard 144, say the shard 144(1), with an allotment of at least a portion of the queued matchmaking requests 136 may execute the matchmaker algorithm for its matchmaker to assign the players 112 associated with those allotted requests 136 to matches of the game, and then the shard 144(1) may wait for a short period of time (e.g., 250 milliseconds, 200 milliseconds while additional matchmaking requests 136 are queued), and the shard 144(1) may repeat executing the matchmaker algorithm for this next batch of queued requests 136. At the end of a reporting interval, the matchmaker shard 144(1) may sum multiple time periods measured from starting the execution of the matchmaker algorithm to stopping the execution of the algorithm in order to compute a total run time of the matchmaker algorithm over a the reporting interval, and this total run time can be divided by the elapsed wall-clock time measured from the start of the first run of the matchmaker algorithm for the reporting interval to the end of the last run of the matchmaker algorithm for the reporting interval. This results in a percentage of a period of time that the matchmaker shard 144(1) spent executing the matchmaker algorithm to assign its allotment(s) of players 112 to matches of the game during a reporting interval, and this percentage (called the "algorithm utilization metric") can be reported to the data store 148 so that the shard adjuster 158 can read the metric 156 and evaluate the metric to determine whether or not to decrease the shard count 146. In one example, a threshold percentage (e.g., 10%) can be used. That is, the shard count 146 may be decreased if the algorithm utilization metric (e.g., a percentage value) fails to violate (e.g., is less than or equal to, or is strictly less than) the threshold percentage. Thus, the algorithm utilization metric is usable to determine whether the current number of matchmaker shards 144 are "underloaded", and, in this case, the shard count 146 can be decreased. In some embodiments, if all shards 144 are underloaded (e.g., if all shards 144 report an algorithm utilization metric that fails to violate the threshold percentage), the shard count 146 may be decreased. This provides a more conservative approach to decreasing the shard count 146, as opposed decreasing the shard count 146 as soon as a single shard 144 is underloaded (assuming multiple shards 144 are executing).

Increasing and/or decreasing the shard count 146 may be done in increments (e.g., by adjusting the shard count 146 one integer at a time, such as by increasing the shard count 146 from 1 to 2, from 2 to 3, from 3 to 4, and so on). Said another way, if the shard count 146 is increased, one additional matchmaker shard 144 may be deployed to a VM instance 150 of a host 152. In the other direction, if the shard count 146 is decreased, one of the currently-active matchmaker shards 144 may be decommissioned (e.g., execution of the instance 150 may be stopped, the instance 150 may be spun down, etc.). In some embodiments, whenever the shard count 146 is to be adjusted, the shard adjuster 158 may determine a target number (from the minimum number to the maximum number) to which the shard count 146 is to be adjusted. For example, if the maximum wait time metric for one or more shards 144 is elevated above a threshold wait time by an above threshold amount (e.g., if the maximum wait time spikes way above the threshold wait time), this may indicate that the shards 144 are extremely overloaded, and the shard count 146 may be increased to a target number that increases the shard count 146 by more than just a single shard 144. This may allow for quickly pushing wait times down to an acceptable amount. In the opposite direction, if the algorithm utilization metric for one or more shards 144 is below the threshold percentage by an above threshold amount, this may indicate that the shards 144 are extremely underloaded, and the shard count 146 may be decreased to a target number that decreases the shard count 146 may more than just a single shard 144. Again, this may allow for quickly mitigating fragmentation of the player population.

The shard adjuster 158 may communicate the target number, and/or an instruction to increase the shard count 146, to the matchmaking service 140 so that a global shard count 146 can be adjusted. For example, by notifying the matchmaking service 140, an updated current value of the shard count 146 can be made accessible to all of the shards 144, such as by storing (e.g., writing to a table) the new shard count 146 in the data store 148.

In the case of increasing the shard count 146, existing tickets 136 may continue to be allocated to the shards 144 to which they were assigned at a time of ingestion. No redistribution of existing tickets 136 to a new shard(s) 144 is needed because tickets 136 are short-lived. New tickets 136, however, may start flowing to newly-deployed shards 144 as a result of the increased shard count 146, and the distribution of tickets 136 amongst the shards 144 is likely to balance out over a short period of time. In the case of decreasing the shard count 146, new tickets 136 naturally get allocated to the active shards 144, but there may be tickets 136 that were allocated to a decommissioned shard(s) 144 and no longer have a matchmaker shard 144 working to find matches for the players 112 associated with those tickets 136. Accordingly, these tickets 136 may be reallocated to a new active shard 144. In some embodiments, this is accomplished by re-ingesting the tickets 136. All queued tickets 136 can be analyzed to determine the shards 144 assigned to the tickets 136, and this may be compared to the currently active shards 144, or the current shard count 146, for the matchmaker in question, and if the assigned shard for a ticket 136 has been decommissioned (e.g., is no longer valid), the ticket 136 may be re-ingested, such that the ticket 136 is reassigned to an active shard 144.

After forming a match, the game-hosting service 106 may be tasked with placing the match. It is to be appreciated that, in some embodiments, short of forming a new match, a matchmaker shard 144 may identify an existing match associated with an already running process 132 that is hosting a game session, and if the active game session has an open player slot(s) that the player(s) 112 associated with the request can be placed into, the matchmaker shard 144 may assign the player(s) 112 to the open player slot(s) in the active game session, without having to form a separate match for the player(s) 112. Otherwise, the game-hosting service 106 may have already spun up VM instances 126 in fleets that are allocated for various subscribers of the service provider network 102, and each of the spun up VM instances 126 may have server processes 132 executing thereon in idle mode until the processes 132 are assigned to a game session request for hosting a corresponding game session (associated with a match) until the game session ends. Other than loading maps and other data for hosting a particular game session, these idle processes may be ready to start hosting a game session as soon as they are assigned to a game session request for a match. The game-hosting service 106 may be tasked with identifying a server process 132 executing on a VM instance 126 that is executing on a common server 122, which will serve multiple players 112 in a set (e.g., 2, 10, 100, etc.) of players 112 that have been matched together for playing a multi-player game. Accordingly, the game-hosting service 106 may resolve a fleet alias by calling a routing service, load fleet data to determine a fleet of VM instances 126 associated with the incoming request, and query the data store 148 to identify available (e.g., idle) processes 132 that are usable to host a game session corresponding to the incoming request. It is to be appreciated that, for efficiency reasons, the game-hosting service 106 may "pack" server processes 132 as tight as possible to avoid overutilization of resources. That is, the game-hosting service 106 may try to minimize the number of processes 132 that are concurrently executing in idle mode in order to have available a sufficient number of processes 132 while also avoiding unnecessary computing resource consumption that could be utilized for other purposes.

After assigning a process 132 to a game session request, a corresponding game session is created, and the assigned process 132 executing on a VM instance 126 of the subscriber's fleet may be instructed to host (or support) the created game session for players 112 of the subscriber 108 who have been assigned to the same match of the game session. The client application(s) running on the client device(s) 114 associated with the game session may receive connection information (e.g., a port of a server 122, an IP address, etc.), and may create a game connection(s) 160 by connecting directly, over the network(s) 120, to the open game server 122 using a player session ID(s). The server process 132 may then accept the player ID(s) as a valid ID(s) and accepts, or rejects, the game connection(s) 160. If connected, the player session is set to active and the players 112 begin playing the game using their client device(s) 114 and the game connection 160 that is established between the game server 122 that has the instance 126 with the process 132 executing to host the selection game session for the given match. Once a game session has ended (e.g., players 112 quit, the game ends, time out, etc.), the client application on each of the involved client devices 114 may disconnect from the process 132, and the game-hosting service 106 can change the game session to terminated, upload a game session log to storage, and update a fleet utilization to indicate that the game server 122 has one less process executing 132.

As mentioned, the game-hosting service 106 may deploy a group of instances 126, often referred to as a "fleet" of instances 126, on game servers 122. In various examples, a fleet of instances 126 may all support the same game build 116, or the same online game. Each instance 126 in a fleet may run multiple processes 132 simultaneously, depending on the hardware capability, and each server process can host at least one game session. Since a game build 116 can have one or multiple executable files, a developer 108 and/or the service provider 104 may configure a fleet to run multiple server processes 132 of each executable on each instance 126.

Figure 2A:
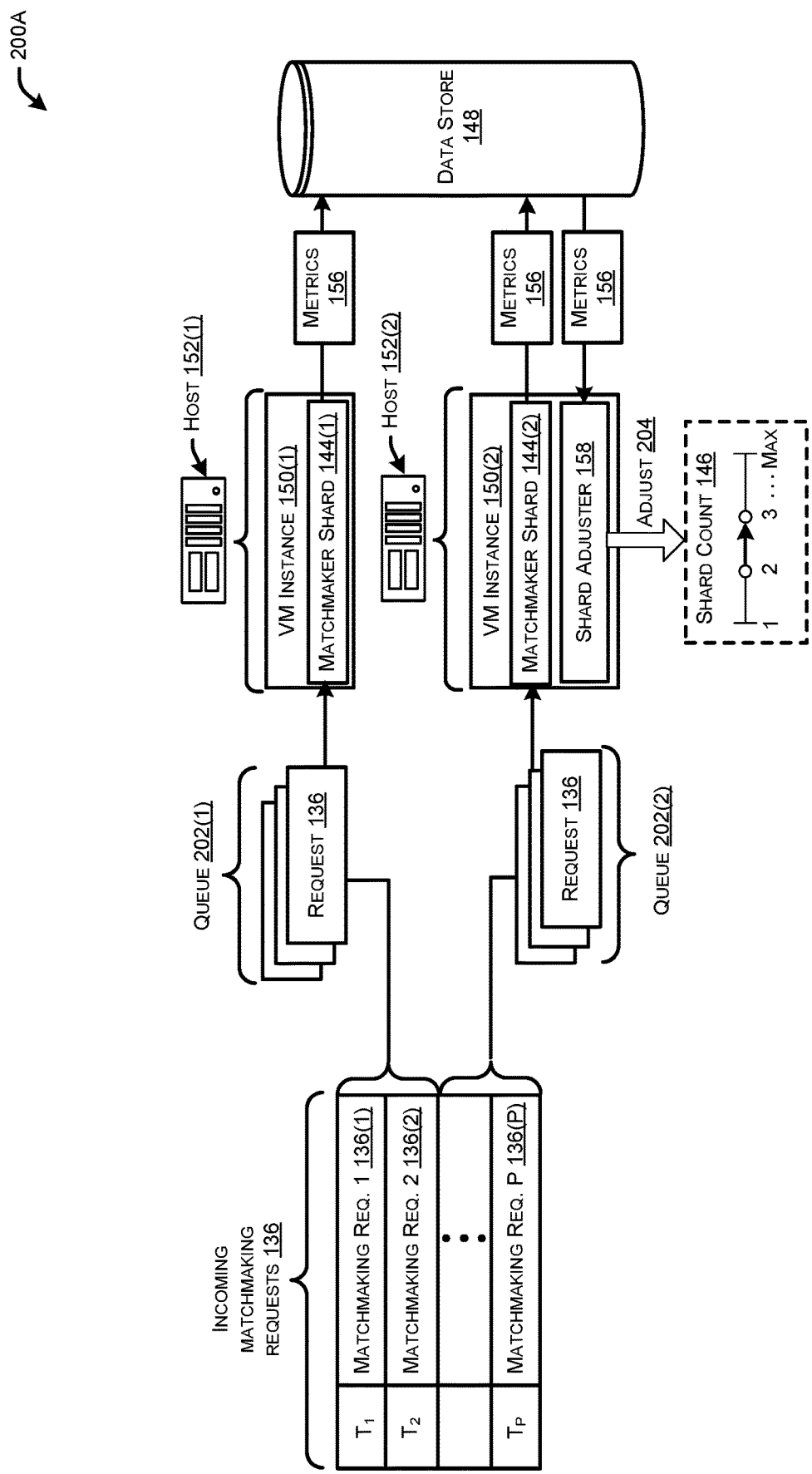
FIG. 2A-2B illustrate schematic diagrams showing an example technique for partitioning a player population associated with queued matchmaking requests amongst a plurality of matchmaker shards, and for adjusting a shard count based on metrics reported by the shards.
Figure 2B:
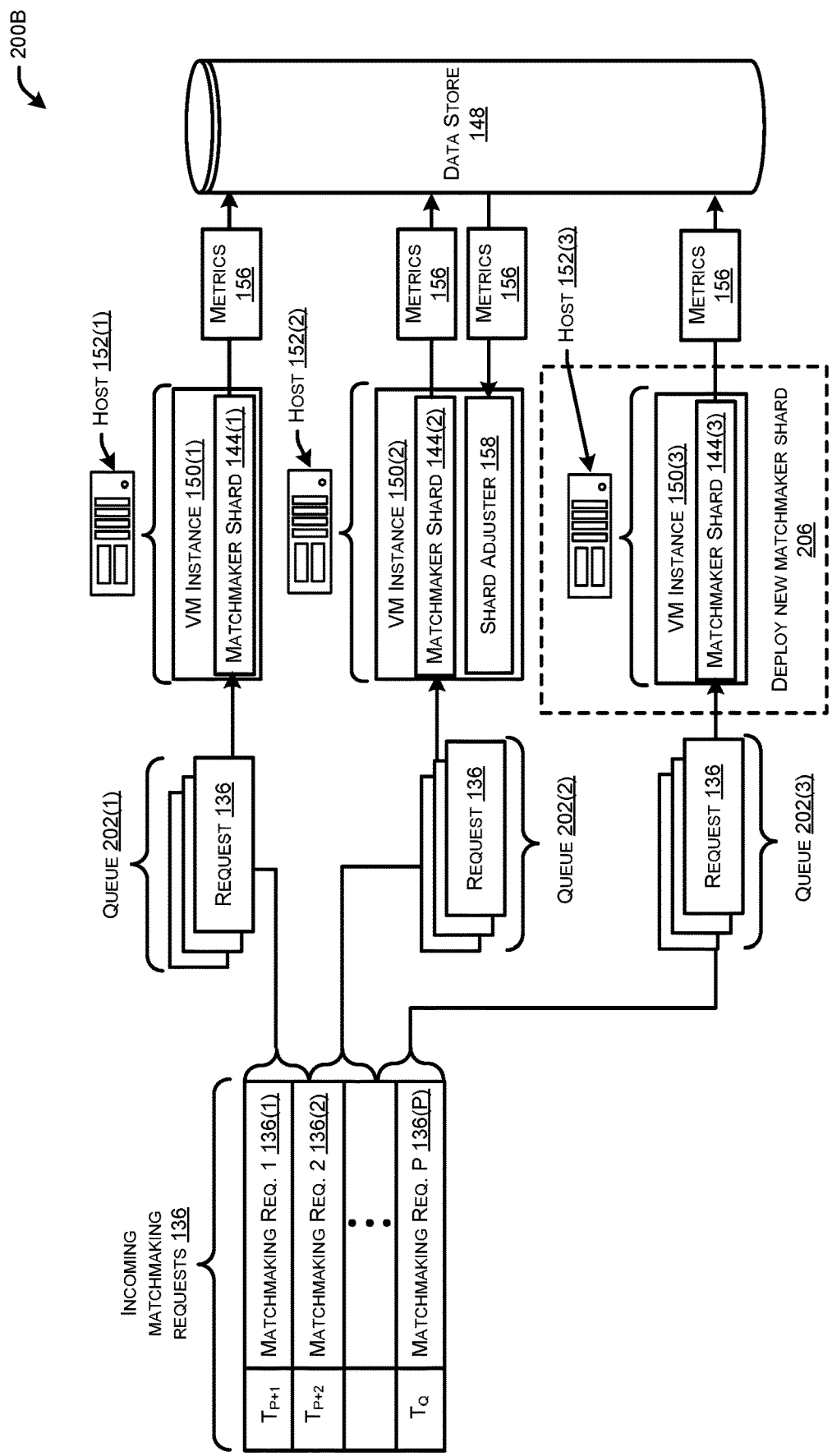

FIG. 2A-2B illustrate schematic diagrams 200A and 200B, respectively, showing an example technique for partitioning a player population associated with queued matchmaking requests 136 amongst a plurality of matchmaker shards 144, and for adjusting a shard count 146 based on metrics 156 reported by the shards 144.

In FIG. 2A, the shard count 146 for a given matchmaker (or matchmaker configuration) is initially set to two shards. This may be an initialized number or it may have been adjusted from a previous number (e.g., previously increased from one shard to two shards). In any case, two matchmaker shards 144(1) and 144(2) are shown as executing on respective VM instances 150(1) and 150(2). In this example, the two shards 144(1) and 144(2) represent shards of a common matmaker configuration for a subscriber 108 of the service provider network 102. Each VM instance 150 may be executing on a host 152. Accordingly, the first VM instance 150(1) is shown as executing on a first host 152(1) and the second VM instance 150(2) is shown as executing on a second host 152(2). However, both instances 150(1) and 150(2) may execute on a single host 152, in some embodiments. In addition, the VM instance 150(2) is shown as being designated as a leader instance who is responsible for reading metrics 156 periodically from the data store 148, and for adjusting, via a shard adjuster 158, the shard count 146 based on the metrics 156. Although FIGS. 2A and 2B can represent a one-to-many correspondence of a single matchmaker (or matchmaker configuration) to multiple shards 144, there may, in some embodiments, be a many-to-many correspondence of multiple matchmakers to multiple shards 144 for a given subscriber 108. With this in mind, in some embodiments, the first shard 144(1) may represent a shard 144 of a first matchmaker of a subscriber 108, and the second shard 144(2) may represent a shard 144 of a second, different matchmaker of the subscriber 108, and the shard count 146 may represent a count of the total number of shards 144 for the multiple matchmakers (or matchmaker configurations). The former example of a one-to-many correspondence of a single matchmaker (or matchmaker configuration) to multiple shards 144 will be predominantly described in the examples herein.

FIG. 2A shows incoming matchmaking requests 136 that are ingested into the system as players 112 are requesting to be placed into matches. The incoming matchmaking requests 136 may vary in number based on whether it is a light traffic time or a heavy traffic time. FIG. 2A shows requests 136(1)-(P), "P" being any number, have been ingested into the system. The system, in addition to determining a matchmaker shard 144 for which the individual requests 136 are to be queued, may record a time, T, at which the request 136 is queued for a given shard 144. Accordingly, the times $T_1$-$T_p$ represent the respective times at which the requests 136(1)-136(P) are queued.

FIG. 2A also shows that a first subset of the requests 136 are queued in a first queue 202(1) for the first matchmaker shard 144(1), and that a second subset of the requests 136 are queued in a second queue 202(2) for the second matchmaker shard 144(2). These queues 202 may be managed for each shard 144 and configured to hold matchmaking requests 136 for assigning players 112 to matches by a given shard 144. As discussed herein, the allocation of requests/tickets 136 to shards 144 (or queues 202 for shards 144) may be random, or it may not be random. For example, partition keys may be used to group together requests 136 associated with players 112 who have been assigned a common partition key value, and the requests 136 associated with players 112 having a common partition key value may be allocated to a given queue 202 of a given shard 144. As another example, a machine learning model(s) may be utilized to allocate the requests 136 so that the player population is distributed amongst the queues 202 of the matchmaker shards 144 in a way that is designed to improve the quality of matches.

The first matchmaker shard 144(1) may execute a matchmaker algorithm to assign players 112 in the first queue 202(1) to matches of a game, and the second matchmaker shard 144(2) may execute the same matchmaker algorithm to assign players 112 in the second queue 202(2) to matches of the game. As this is done, start and stop times of running the matchmaker algorithm may be recorded, and as more incoming matchmaking requests 136 are received, the requests 136 may be distributed into the respective queues 202 of the respective shards 144, and the shards 144 may iteratively assign players 112 to matches of a game, as described herein.

At a reporting interval (e.g., every 15 seconds), the shards 144 report metrics 156 that may be stored in the data store 148. Periodically, the leader instance 150(2) reads the metrics 156 reported from all shards 144 and provides the metrics 156 as input to the shard adjuster 158. As described herein, the metrics 156 may include, among other metrics, a maximum wait time metric reported by each shard 144, as well as an algorithm utilization metric reported by each shard 144. These metrics 156 may indicate, or may be used to determine, whether the shards 144 are overloaded or underloaded at the present time. In the example of FIG. 2A, the shard adjuster 158 determines that the shards 144(1) and 144(2) are presently overloaded based on the metrics 156, and determines to adjust 204 the shard count 146 by increasing the shard count 146 from two shards to three shards. For example, the maximum wait time metric 156 reported by the first matchmaker shard 144(1) may have violated a threshold wait time for a predetermined period of time. For example, the first shard 144(1) may have reported a maximum wait time metric of 5 seconds at the end of a first reporting interval, followed by a maximum wait time metric of 6 seconds at the end of a second reporting interval, followed by a maximum wait time metric of 6 seconds at the end of a third reporting interval, followed by a maximum wait time metric of 7 seconds at the end of a fourth reporting interval. In this example, the multiple maximum wait time metrics reported may violate a threshold wait time of, say, 5 seconds. In other words, for the last minute, the longest waiting player in each batch of matchmaking requests 136 has waited too long, and the shard adjuster 158 determines to increase the shard count 146 to three shards.

FIG. 2B illustrates the effect of this increase of the shard count 146 to three shards 144. For example, a new, third matchmaker shard 144(3) may be deployed 206 for execution on a third VM instance 150(3) of a third host 152(3), and the incoming requests 136 received after the increase of the shard count 146 may be distributed amongst the three queues 202(1), 202(2), and 202(3) so that the three matchmaker shards 144(1)-(3) can each work on their respective player allotments.

Figure 3:
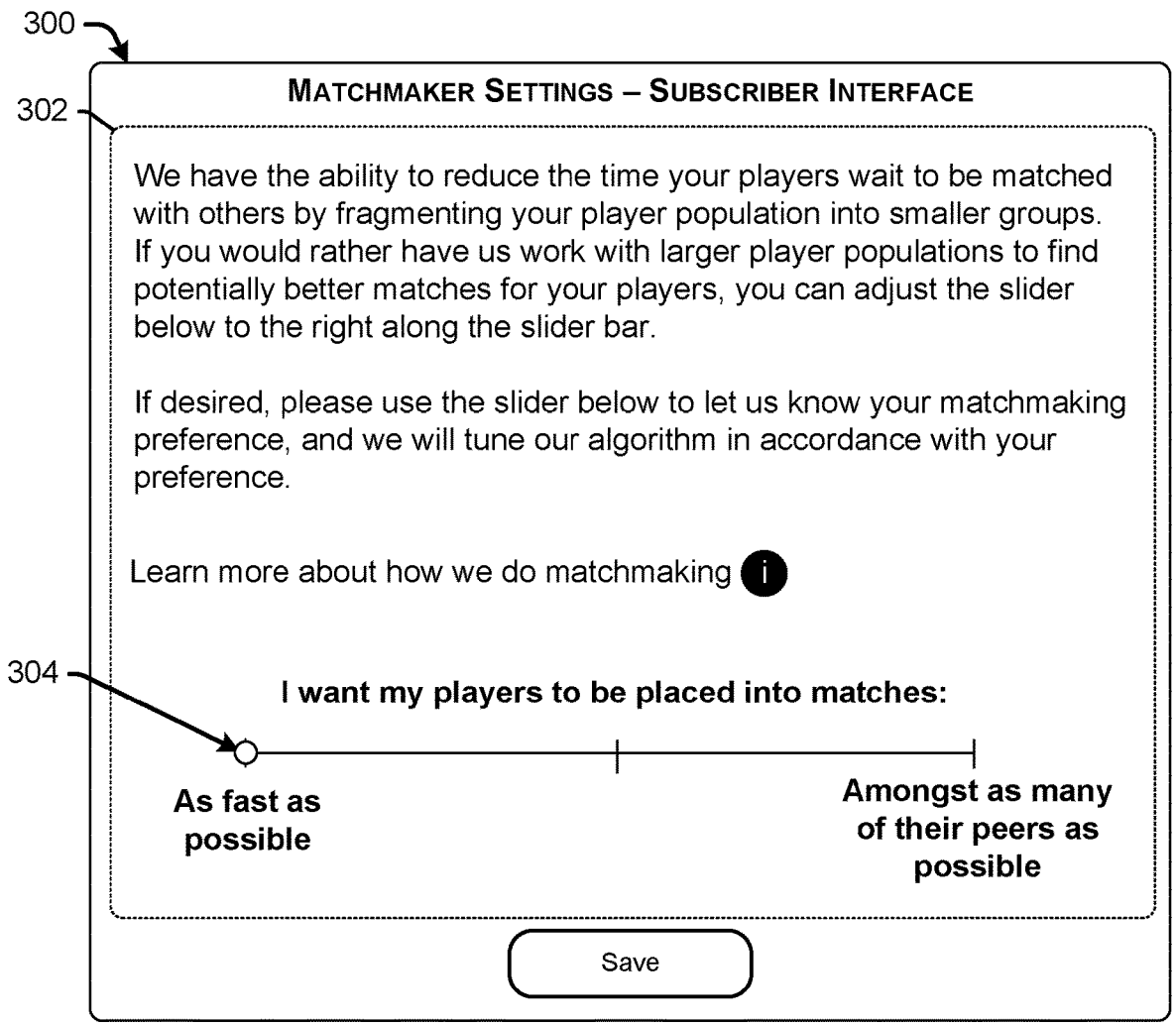
FIG. 3 illustrates an example graphical user interface by which a subscriber can adjust a parameter that controls the sensitivity of adjusting a shard count up and/or down, allowing the subscriber to customize how matchmaker shards are to be increased and/or decreased.

FIG. 3 illustrates an example graphical user interfaces 300 by which a subscriber 108 can adjust a parameter that controls the sensitivity of adjusting a shard count 146 up and/or down, allowing the subscriber 108 to customize how (e.g., when, how fast, and/or by how much) matchmaker shards 144 are to be increased and/or decreased. The subscriber 108 may have created a subscriber profile or account with the service provider network 102 and may access the user interface 200 via a developer portal 118.

The subscriber user interface 300 may include a message portion 302 that explains that a game hosting service 106 has the ability to reduce the time the subscriber's 108 players 112 wait to be matched with others by fragmenting the subscriber's 108 player population into smaller groups (e.g., distributing the player population amongst the multiple matchmaker shards 144, as described herein). The message portion 302 may further explain a parameter that is adjustable via a control element 304 (e.g., a slider bar) to control an aspect of the adjustment of the shard count 146 that dictates the number of matchmaker shards 144 deployed at a given time for the subscriber's 108 matchmaker. In the example user interface 300 of FIG. 3, the control element 304 may be set to the farthest left position possible (e.g., to match the subscriber's 108 players 112 as fast as possible), and the subscriber 108 may adjust a parameter by manipulating the control element 304, such as by moving a slider to the right to indicate that the subscriber 108 is willing to have its players 112 wait a little bit longer to be placed into higher-quality matches (e.g., to be placed into matches amongst as many of their peers as possible). This "wait time" parameter may be configurable on a per-game basis so that the subscriber 108 can control the wait times permissible for different games. For example, for certain types of games where players 112 play for long hours and get very involved with the gameplay, the subscriber 108 may set a longer permissible wait time (e.g., by moving the control element 304 farther to the right on the user interface 300) because players 112 of the game may be willing to wait longer for a quality match. By contrast, for a game that is played for a short time (perhaps by players 112 that do not spend a lot of time playing online games), the permissible wait time may be set to a shorter amount of time by the subscriber 108 (or the subscriber 108 may leave the control element 304 at the far left of the slider bar) because players 112 of the game may be less willing to wait to be placed into a match if they care little about with whom they play the game.

The processes described herein are illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 4:
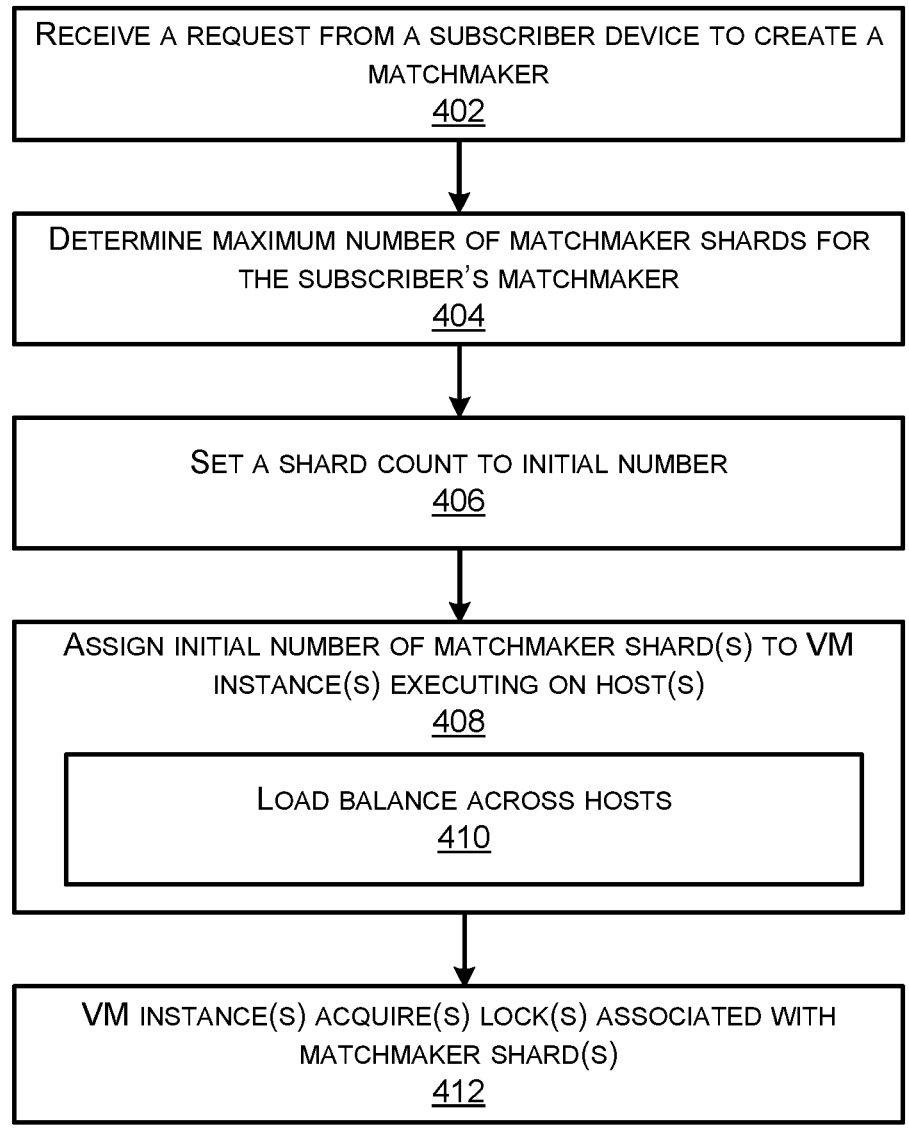
FIG. 4 illustrates a flow diagram of an example process for setting up a matchmaker for a subscriber of a service provider network.

FIG. 4 illustrates a flow diagram of an example process 400 for setting up a matchmaker for a subscriber 108 of a service provider network 102. For discussion purposes, the process 400 is described with reference to the previous figures.

At 402, a computing device(s) of a service provider network 102 may receive a request 142, from a subscriber device 110 of the subscriber 108, to create a new matchmaker. This create matchmaker request 142 may be received over a network(s) 120 and/or via the developer portal(s) 118 of FIG. 1. As part of this create matchmaker request 142, the subscriber 108 may configure customized matchmaking rules using a customizable rules engine that allows subscriber 108 to design how to match players 112 together based on player attributes, game modes, skill level, geographic regions, etc. These matchmaking rules are to be adhered to when matching players 112 together into matches. These matchmaking rules can be based on any suitable factors, such as, without limitation, skill level of the players 112, amount of time the players 112 have been waiting to be placed into a match, geographic regions of the players 112, social connections amongst the players 112, player preferences for particular game attributes or features (e.g., maps, weapons, etc.), and/or other factors.

At 404, the computing device(s) of a service provider network 102 may determine a maximum number, Max, to which the shard count 146 is adjustable for the newly-created matchmaker. For example, as described herein, the matchmaking software corresponding to the newly-created matchmaker may be implemented as a number of matchmaker shards 144, where each shard 144 can potentially run on a different host 152 within the service provider network 102. In some embodiments, the determination at block 404 may include consulting an override table maintained in a data store 148 to determine a maximum shard value, Max, from the override table for the given subscriber 108, and copying the maximum shard value, Max, to the subscriber's 108 settings for that newly-created matchmaker to indicate the maximum number, Max, of shards 144 to which the shard count 146 is adjustable for that matchmaker.

At 406, the computing device(s) of a service provider network 102 may initialize the shard count 146 at the first (initial) number of matchmaker shards 144. The shard count 146 may be initialized at any suitable initial number from a minimum number (e.g., one shard) to the maximum number, Max, determined at block 404. In some embodiments, the initial number of shards 144 may be set to the minimum number. For example, if the minimum number to which the shard count 146 is adjustable equals one shard, the shard count 146 may be initialized to one shard at block 406. In some embodiments, the initial number of shards 144 may be set to a number greater than the minimum number, and this determination of the initial number may be based at least in part on a matchmaking preference set by the subscriber 108, such as the matchmaking preference described with respect to FIG. 3.

At 408, the computing device(s) of a service provider network 102 may assign the first (initial) number of matchmaker shards 144 to one or more VM instances 150 executing on respective host computers 152. If the initial number of matchmaker shards 144 equals one shard 144, the assignment at block 408 may be to a single VM instance 150 executing on a single host computer 152. However, if the initial number of matchmaker shards 144 equals a number greater than one, the assignment at block 408 may be to multiple VM instances 150, possibly executing on multiple host computers 152. As shown by sub-block 410, this assignment at block 408 may include a load-balancing operation(s). For example, the assignment of an individual matchmaker shard 144 to a VM instance 150 of a given host 152 at block 408 may be carried out by a "load balancing node." In some embodiments, one of the VM instances 150 may be designated as this load balancing node using a system of distributed locks. Consider an example where the VM instance 150(N) shown in FIG. 1 is designated as the load balancing node. This designation may be made by the VM instance 150(N) claiming ownership of (or acquiring) a particular lock. With this particular lock acquired, the VM instance 150(N) may determine, or select, the most appropriate VM instance 150 and/or host 152 to which an individual matchmaker shard 144 should be assigned at block 408. The selection of the most appropriate VM instance 150 and/or host 152 to host the matchmaker shard 144 may be based on various factors including, without limitation, a current capacity of the host 152 and/or the current capacity of the VM instance 150, whether the VM instance 150 is in charge of other tasks, such as reading metrics reported by other shards 144 for determining whether to adjust the shard count 146, etc.

At 412, the assigned VM instance(s) 150 may obtain or acquire a lock that is associated with (or specific to) the matchmaker shard 144 in order to secure ownership of the matchmaker shard 144, and this information may be written to a lock table maintained in the data store 148. After the initial assignment, the load balancing node may be configured to, at one or more different times (e.g., periodically, in response to the occurrence of an event, etc.), analyze the factors it uses for assigning shards 144 to VM instances 150 and/or hosts 152 at block 408, and determine whether any shards 144 can be redistributed/reassigned to other VM instances 150 and/or hosts 152 to provide an improved balance of shards across VM instances 150 and/or hosts 152.

Figure 5:
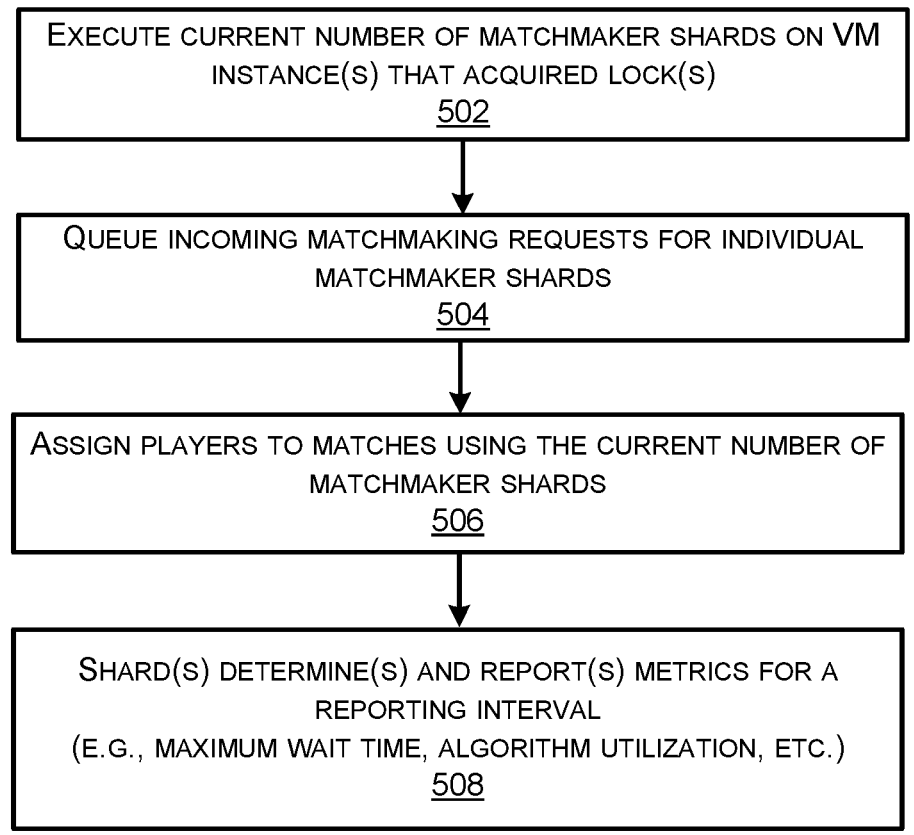
FIG. 5 illustrates a flow diagram of an example process for assigning players to matches of a game using one or more active matchmaker shards deployed on VM instances of host computers.

FIG. 5 illustrates a flow diagram of an example process 500 for assigning players 112 to matches of a game using one or more active matchmaker shards 144 deployed on VM instances 150 of host computers 152. For discussion purposes, the process 500 is described with reference to the previous figures.

At 502, a computing device(s) of a service provider network 102 may execute a first (current) number of matchmaker shards 144 on one or more VM instances 150 allocated to a subscriber 108 of the service provider network 102. For example, the VM instance(s) 150 on which the first number of matchmaker shards 144 is executing may be the instance(s) 150 that acquired the lock(s) for the shard(s) 144 at 412 of the process 400. The first number of matchmaker shards 144 executed at block 502 may be an initial number of shards (e.g., a minimum number, such as one shard), or a number that was adjusted from the previous number of shards 144. In any case, the first number of matchmaker shards 144 executed at block 502 may be one shard or multiple shards, and may include at least a first matchmaker shard 144(1) executing on a first VM instance 150(1) of a first host computer 152(1). Furthermore, as described herein, in a scenario where the current number of shards 144 is greater than one, the multiple shards 144 may be executing on the same VM instance 150, on different VM instances 150 of the same host 152, or on VM instances 150 across different hosts 152.

At 504, the computing device(s) of a service provider network 102 may queue incoming matchmaking requests 136 associated with a plurality of players 112 of a game associated with the subscriber 108 as queued matchmaking requests 136. If the first (current) number of shards 144 at block 502 equals one shard, all incoming matchmaking requests 136 may be queued for a single matchmaker shard 144(1). However, if the first (current) number of shards 144 at block 502 equals a number greater than one, the queuing at block 504 may distribute the incoming matchmaking requests 136 amongst the multiple shards 144 (e.g., in respective queues 202, as described by way of example in FIGS. 2A and 2B. This distribution of requests 136 amongst multiple shards 144 may be random, or it may not be random (e.g., based on time of receipt of the requests 136, based on a partitioning key associated with players 112 of the requests 136, a machine learning model(s), etc.). Furthermore, the queueing at block 504 may occur during a reporting interval for the matchmaker shard(s) 144 in question, where the shard(s) 144 is/are configured to report one or more metrics 156 at a frequency of the reporting interval.

At 506, the computing device(s) of a service provider network 102 may assign, using the first (current) number of matchmaker shards 144, the plurality of players 112 to matches of the game associated with the subscriber 108. This assignment at block 506 may include each shard 144 of the first (current) number of shards 144 periodically executing a common matchmaker algorithm to assign the plurality of players 112 to matches of the game. This algorithm may assign players 112 to matches in accordance with matchmaking rules (e.g., customized matchmaking rules created by the subscriber 108). Furthermore, the assigning at block 506 may occur during a reporting interval for the matchmaker shard(s) 144 in question, where the shard(s) 144 is/are configured to report one or more metrics 156 at a frequency of the reporting interval.

At 508, each shard 144 of the first (current) number of shards 144 may determine one or more metrics 156, and report the metric(s) 156 to a data store 148 for a reporting interval. As described herein, the metrics 156 determined and reported at block 508 may include, without limitation, a maximum wait time metric, an algorithm utilization metric, and possible additional metrics. An individual wait time may be computed as a time between a first time at which a matchmaking request 136 was queued and a second time at which a matchmaker shard 144 started executing the matchmaker algorithm to assign a player(s) 112 associated with the matchmaking requests 136 to a match of the game. As multiple requests 136 are processed during a reporting interval in this manner, multiple computed wait times may be compared to determine a maximum wait time in the set of computed wait times for a reporting interval, and the maximum wait time may be reported at the end of each reporting interval in this manner. To determine the algorithm utilization metric, as described herein, the shard 144 may determining a percentage of a period of time that it spent executing the matchmaker algorithm to assign the players 112 to matches of the game, where the period of time corresponds to a reporting interval. In other words, over the course of a reporting interval (e.g., 15 seconds), the matchmaker algorithm may be started and stopped iteratively by the shard 144 to assign batches of players 112 to matches of the game, and the algorithm utilization metric may be indicative of the time it spent executing the matchmaker algorithm during this reporting interval, and the algorithm utilization metric may be reported at the end of each reporting interval in this manner.

It is to be appreciated that matching requests 136 may be queued iteratively at block 504 as requests 136 are received, that players may be assigned to matches of the game iteratively at block 506 at any suitable first interval (e.g., a few times per second), and that metrics 156 relating to one or more of these operations may be reported iteratively at block 508 at any suitable second interval (e.g., every 15 seconds), which may correspond to the "reporting interval" described elsewhere herein. These respective intervals can, in some embodiments, be the same interval, but in many of the examples described the intervals are different. In this manner, each of blocks 504, 506, and 508 can iterate on its own, independent loop at any suitable rate.

Figure 6:
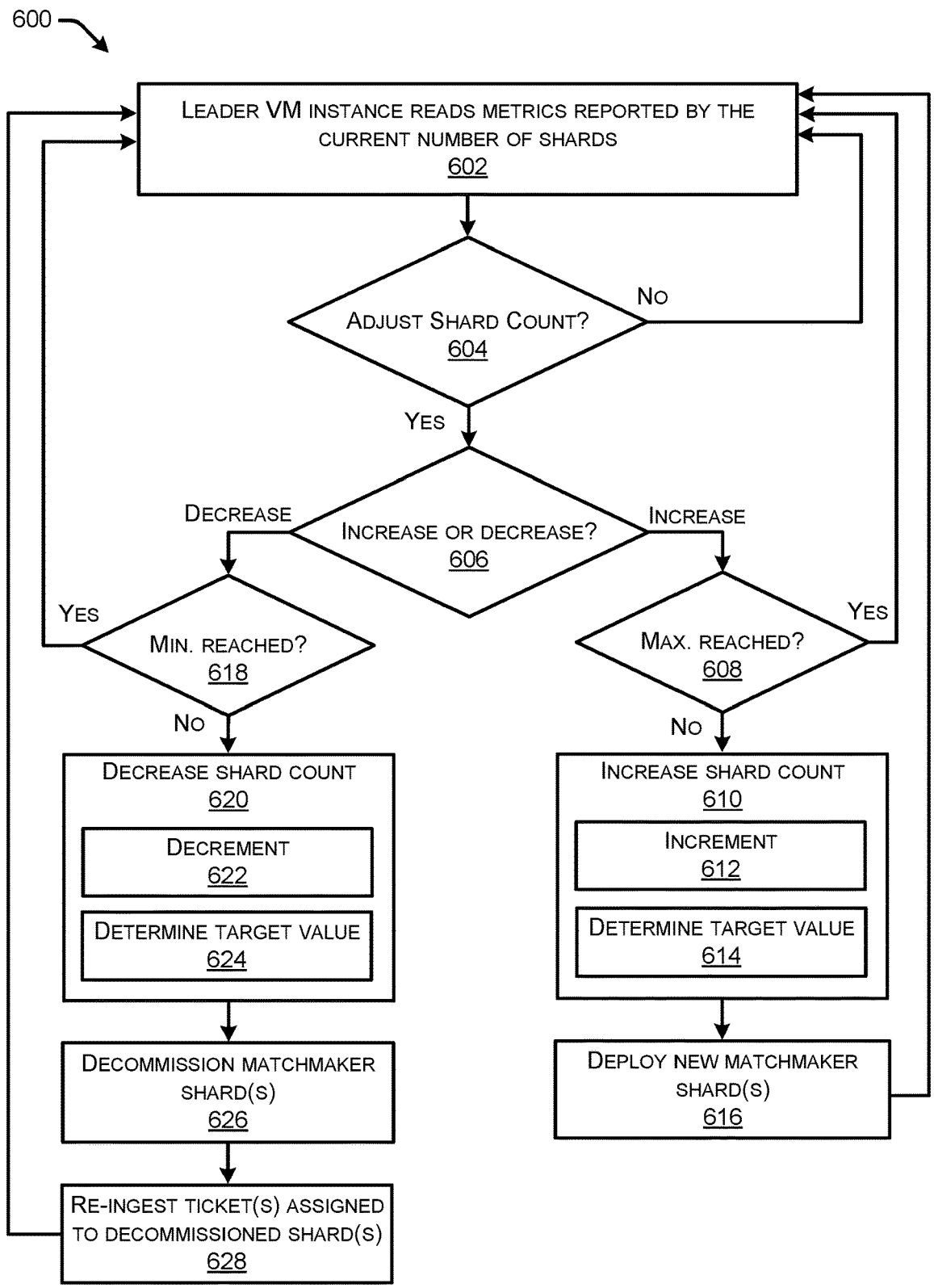
FIG. 6 illustrates a flow diagram of an example process for dynamically adjusting a shard count based on metrics associated with one or more active matchmaker shards.

FIG. 6 illustrates a flow diagram of an example process 600 for dynamically adjusting a shard count 146 based on metrics 156 associated with one or more active matchmaker shards 144. For discussion purposes, the process 600 is described with reference to the previous figures.

At 602, a leader VM instance 150 may query the data store 148 to read the metrics 156 reported by the current number of matchmaker shards 144 executing to assign players 112 to matches of a game. This may be done on a periodic basis, as described herein, and as indicated by the return arrows in FIG. 6 leading back to block 602. For example, the reading of the metrics 156 at block 602 may include reading a metric(s) 156 associated with queued matchmaking requests indicating whether a shard(s) 144 is/are overloaded (e.g., maximum wait time metrics 156) reported by the current number of matchmaker shards 144, and/or reading a metric(s) 156 indicating whether a shard(s) 144 is/are underloaded (e.g., algorithm utilization metrics 156) reported by the current number of matchmaker shards 144. In some embodiments, the reading include reading multiple reports of the same metric 156 from a single shard 144 that have been reported over a time window. For example, the reading at block 602 may include reading the last several maximum wait time metrics reported by a first matchmaker shard 144(1), and/or the last several algorithm utilization metrics reported by the first matchmaker shard 144(1).

At 604, a computing device(s) of a service provider network 102 may determine whether to adjust the shard count 146 of the matchmaker in question. This may be based on the metrics 156 read at block 602. If, based on the metrics 156, the computing device(s) determines not to adjust the shard count 146, the process 600 may follow the "NO" route from block 604 back to block 602 to read additional metrics 156 as they are reported out by the shard(s) 144. If, based on the metrics 156, the computing device(s) determines to adjust the shard count 146, the process 600 may follow the "YES" route from block 604 to block 606.

At 606, the computing device(s) of a service provider network 102 may determine whether to increase or decrease the shard count 146. For example, the determination at block 606 may be to increase the shard count 146 based on one or more maximum wait time metrics 156 read at block 602. In this scenario, the process 600 may follow the "INCREASE" route from block 606 to block 608.

At 608, the computing device(s) of a service provider network 102 may determine whether a maximum number to which the shard count 146 is adjustable has been reached. If the maximum number has been reached, the process 600 may follow the "YES" route from block 608 back to block 602 to read additional metrics 156 as they are reported out by the shard(s) 144, seeing as how the shard count 146 cannot be increased beyond the maximum number. If the maximum number has not been reached, the process 600 may follow the "NO" route from block 608 to block 610.

At 610, the computing device(s) of a service provider network 102 may increase the shard count 146 from a first (current) number to a second number greater than the first number. As shown by sub-block 612, the increasing of the shard count 146 may include incrementing the shard count 146 by a single shard 144. As shown by sub-block 614, however, the increasing of the shard count 146 may include determining a second number to which the shard count is to be increased, and increasing the shard count 146 to the second number. This may involve increasing the shard count 146 by a number of shards 144 greater than one, as described herein.

At 616, the computing device(s) of a service provider network 102 may deploy a new matchmaker shard(s) 144 on one or more VM instances 150 of a host(s) 152. This may involve spinning up new VM instances 150 on a selected host(s) 152, such as using a load balancing algorithm to determine if a new shard 144 should be deployed on a new host 152 to provide additional processing resources for running the matchmaker algorithm. As shown by the return arrow from block 616 to block 602, the process 600 may iterate after increasing the shard count 146 and deploying a new shard(s) 144 to read additional metrics 156 as they are reported out by the shard(s) 144.

Returning to block 606, the determination at block 606 may be to decrease the shard count 146 based on one or more algorithm utilization metrics 156 read at block 602. In this scenario, the process 600 may follow the "DECREASE" route from block 606 to block 618.

At 618, the computing device(s) of a service provider network 102 may determine whether a minimum number to which the shard count 146 is adjustable has been reached. If the minimum number has been reached, the process 600 may follow the "YES" route from block 618 back to block 602 to read additional metrics 156 as they are reported out by the shard(s) 144, seeing as how the shard count 146 cannot be decreased beyond the minimum number. If the minimum number has not been reached, the process 600 may follow the "NO" route from block 618 to block 620.

At 620, the computing device(s) of a service provider network 102 may decrease the shard count 146 from a first (current) number to a second number less than the first number. As shown by sub-block 622, the decreasing of the shard count 146 may include decrementing the shard count 146 by a single shard 144. As shown by sub-block 624, however, the decreasing of the shard count 146 may include determining a second number to which the shard count is to be decreased, and decreasing the shard count 146 to the second number. This may involve decreasing the shard count 146 by a number of shards 144 greater than one, as described herein.

At 626, the computing device(s) of a service provider network 102 may decommission at least one of the active matchmaker shards 144 as a decommissioned matchmaker shard 144. This may involve spinning down a VM instance(s) 150 on which the active shard(s) 144 is/are executing.

At 628, the computing device(s) of a service provider network 102 may re-ingest individual ones of the queued matchmaking requests 136 that were assigned to the decommissioned matchmaker shard 144 as one or more re-ingested matchmaking requests 136. As shown by the return arrow from block 628 to block 602, the process 600 may iterate after decreasing the shard count 146 and decommissioning one or more shards 144 to read additional metrics 156 as they are reported out by the shard(s) 144. It is to be appreciated that, after increasing or decreasing the shard count 146, the process 500 may be carried out with the current number of matchmaker shards 144.

Figure 7:
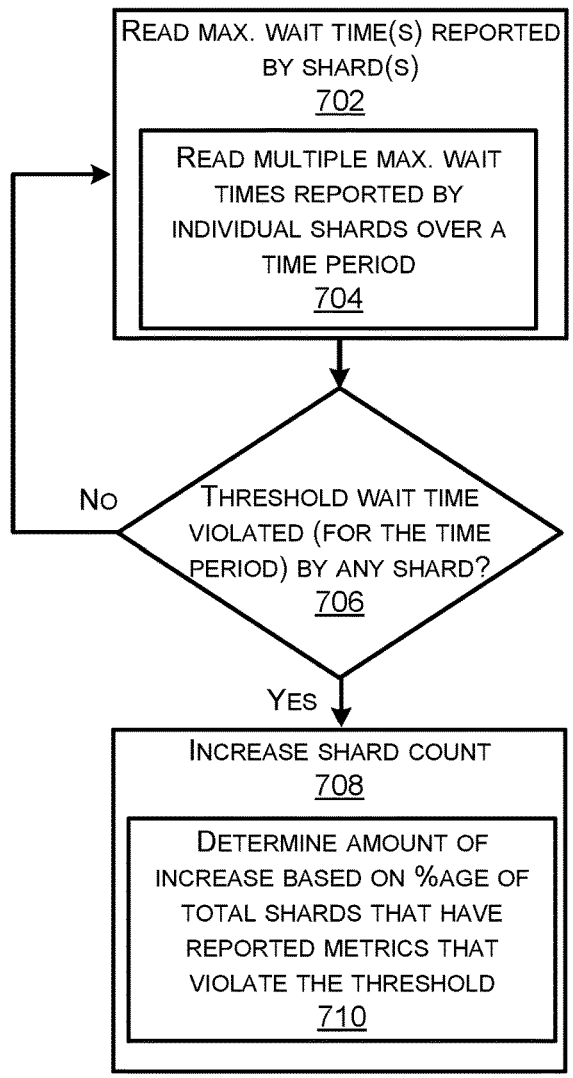
FIG. 7 illustrates a flow diagram of an example process for determining whether to increase the shard count based on a maximum wait time metric(s) using a threshold.

FIG. 7 illustrates a flow diagram of an example process 700 for determining whether to increase the shard count 146 based on a maximum wait time metric(s) 156. For discussion purposes, the process 700 is described with reference to the previous figures.

At 702, a computing device(s) of a service provider network 102 may read one or more maximum wait times reported by a current number of matchmaker shards 144. The number of maximum wait times read depends on the current number of matchmaker shards 144. For example, if the current shard count 146 is set to one shard 144, a single maximum wait time may be read at block 702. If the current shard count 146 is set to two shards 144, two maximum wait times may be read at block 702, and so on. As shown by sub-block 704 the computing device(s) may read multiple maximum wait times reported by an individual matchmaker shard 144 over a predetermined period of time. In an illustrative example, if one or more matchmaker shards 144 each report four maximum wait times over a predetermined period of time (e.g., a minute), four maximum wait times may be read for each matchmaker shard 144.

At 706, the computing device(s) of a service provider network 102 may determine whether the maximum wait time(s) read at block 702 violates (e.g., is greater than or equal to, or is strictly greater than) a threshold wait time (e.g., 3 seconds, 4 seconds, 5 seconds, etc.). In some embodiments, the determination at block 706 may involve determining whether a value based on (e.g., an average of) multiple maximum wait times reported by an individual matchmaker shard 144 over the predetermined period of time violates the threshold wait time. If the threshold wait time is violated at block 706 for any shard 144, the process 700 may follow the "YES" route from block 706 to block 708.

At 708, the shard count 146 may be increased, as described herein. At sub-block 710, the increasing of the shard count 146 may include determining a number to which the shard count is to be increased, and increasing the shard count 146 to that number (e.g., increasing by a number greater than one). The determination of the number (e.g., the amount of the increase) may be based at least in part on the percentage of total shards 144 that have reported metrics (e.g., maximum wait times) that violate the threshold at block 706. For example, if 10% of the shards 144 reported maximum wait times that violate the threshold wait time, the shard count 146 may be increased to a first number, and if 90% of the shards 144 reported maximum wait times that violate the threshold wait time, the shard count 146 may be increased by a second number greater than the first number. If, at block 706, the threshold wait time is not violated for any shard 144, the process 700 may follow the "NO" route from block 706 to block 702 without increasing the shard count 146.

Figure 8:
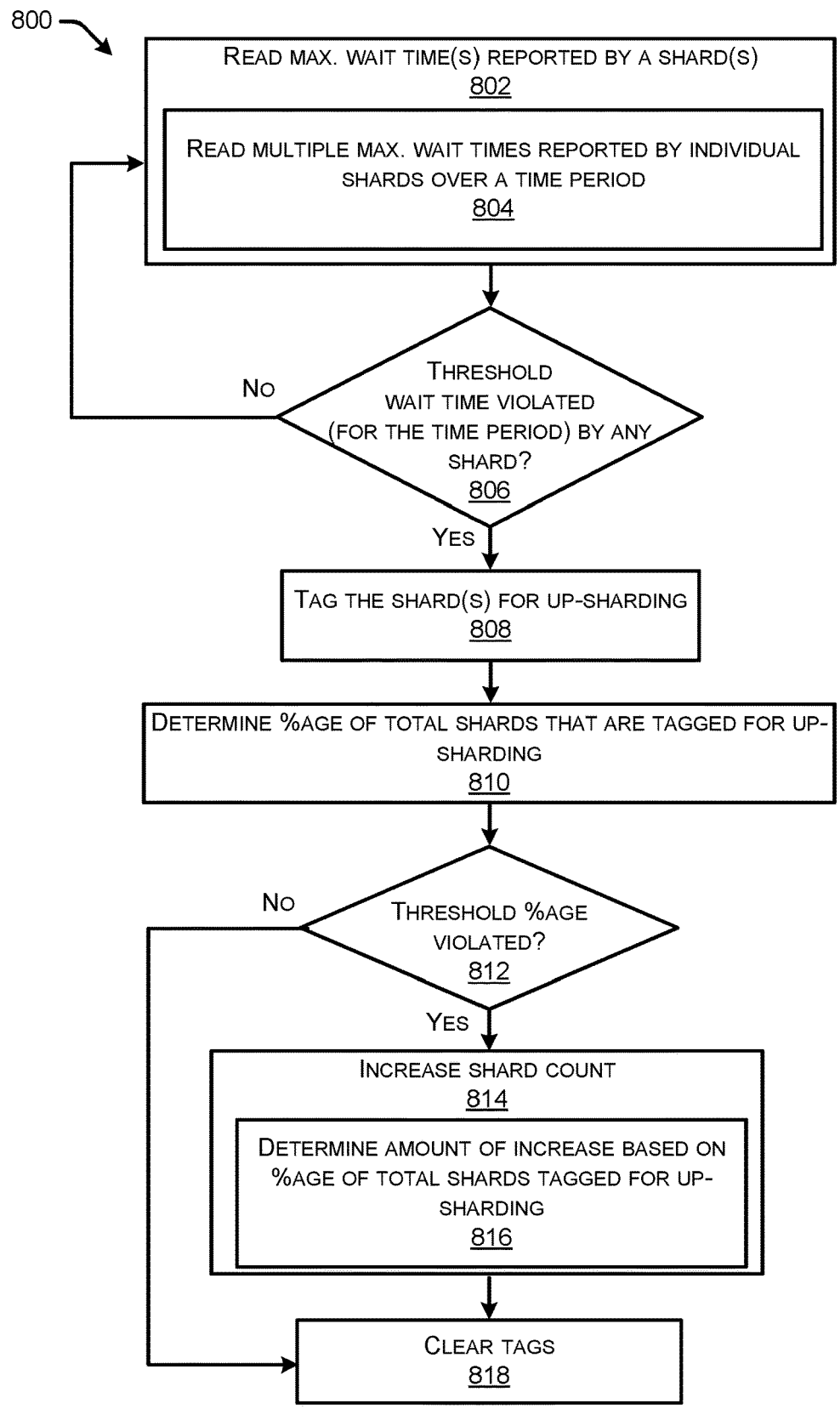
FIG. 8 illustrates a flow diagram of an example process for determining whether to increase the shard count based on a maximum wait time metric(s) using thresholds with a tagging approach.

FIG. 8 illustrates a flow diagram of an example process 800 for determining whether to increase the shard count 146 based on a maximum wait time metric(s). For discussion purposes, the process 800 is described with reference to the previous figures.

At 802, a computing device(s) of a service provider network 102 may read one or more maximum wait times reported by a current number of matchmaker shards 144. The number of maximum wait times read depends on the current number of matchmaker shards 144. For example, if the current shard count 146 is set to one shard 144, a single maximum wait time may be read at block 802. If the current shard count 146 is set to two shards 144, two maximum wait times may be read at block 802, and so on. As shown by sub-block 804 the computing device(s) may read multiple maximum wait times reported by an individual matchmaker shard 144 over a predetermined period of time. In an illustrative example, if one or more matchmaker shards 144 each report four maximum wait times over a predetermined period of time (e.g., a minute), four maximum wait times may be read for each matchmaker shard 144.

At 806, the computing device(s) of a service provider network 102 may determine whether the maximum wait time(s) read at block 802 violates (e.g., is greater than or equal to, or is strictly greater than) a threshold wait time (e.g., 3 seconds, 4 seconds, 5 seconds, etc.). In some embodiments, the determination at block 806 may involve determining whether a value based on (e.g., an average of) multiple maximum wait times reported by an individual matchmaker shard 144 over the predetermined period of time violates the threshold wait time. If the threshold wait time is not violated at block 806 for any shard 144, the process 800 may follow the "NO" route from block 806 to block 802 without increasing the shard count 146. If the threshold wait time is violated at block 806 for any shard 144, the process 800 may follow the "YES" route from block 806 to block 808.

At 808, the computing device(s) of a service provider network 102 may tag the matchmaker shard(s) 144 that reported metrics in violation of the threshold with a tag. This tag may be an "up-sharding" tag that is to be used to determine whether to increase the shard count 146, as described herein.

At 810, the computing device(s) of a service provider network 102 may determine a percentage of the number of matchmaker shards 144 tagged with the tag. For example, if five out of ten active shards 144 are tagged with the up-sharding tag, the percentage determined at block 810 is 50%.

At 812, the computing device(s) of a service provider network 102 may determine whether the percentage of shards tagged with the tag violates (e.g., is greater than or equal to, is strictly greater than, etc.) a threshold percentage (e.g., 20%, 30%, 50%, etc.). If the threshold percentage is violated at block 812, the process 800 may follow the "YES" route from block 812 to block 814.

At 814, the shard count 146 may be increased, as described herein. At sub-block 816, the increasing of the shard count 146 may include determining a number to which the shard count is to be increased, and increasing the shard count 146 to that number (e.g., increasing by a number greater than one). The determination of the number (e.g., the amount of the increase) may be based at least in part on the percentage of total shards 144 that are tagged for up-sharding. For example, if 10% of the shards 144 are tagged for up-sharding, the shard count 146 may be increased to a first number, and if 90% of the shards 144 are tagged for up-sharding, the shard count 146 may be increased by a second number greater than the first number.

At 818, the up-sharding tags on the active shards 144 may be cleared such that none of the active shards are tagged with the up-sharding tag anymore. If, at block 812, the threshold percentage is not violated, the process 800 may follow the "NO" route from block 812 to block 818 in order to clear the tags without increasing the shard count 146.

Figure 9:
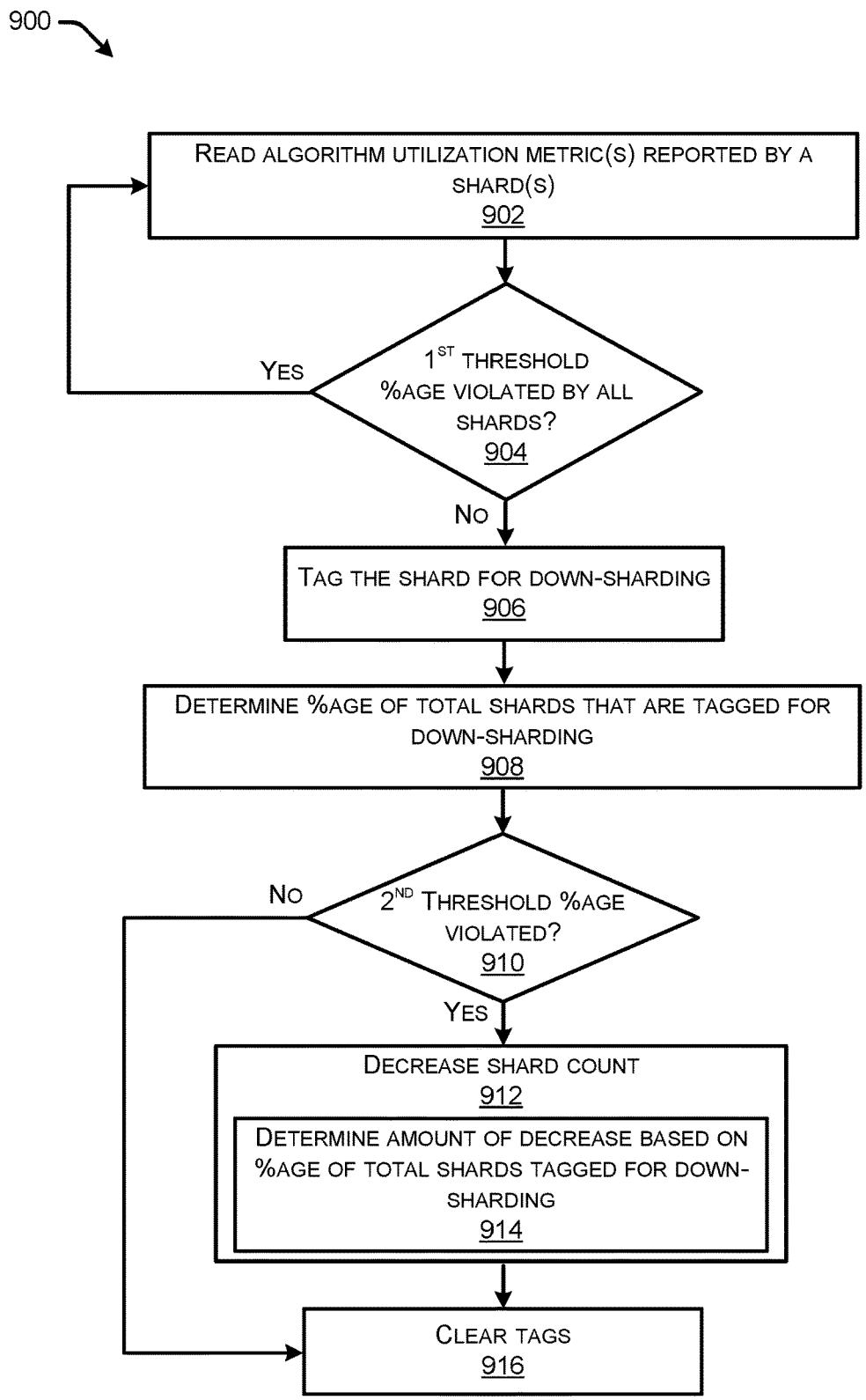
FIG. 9 illustrates a flow diagram of an example process for determining whether to decrease the shard count based on an algorithm utilization metric(s) using thresholds with a tagging approach.

FIG. 9 illustrates a flow diagram of an example process 900 for determining whether to decrease the shard count 146 based on an algorithm utilization metric(s). For discussion purposes, the process 900 is described with reference to the previous figures.

At 902, a computing device(s) of a service provider network 102 may read an algorithm utilization metric(s) 156 reported by a current number of matchmaker shards 144, as described herein. The number of algorithm utilization metrics read depends on the current number of matchmaker shards 144. For example, if the current shard count 146 is set to two shards 144, two algorithm utilization metrics may be read at block 902. If the current shard count 146 is set to three shards 144, three algorithm utilization metrics may be read at block 902, and so on.

At 904, the computing device(s) of a service provider network 102 may determine whether the algorithm utilization metric(s) read at block 902 (e.g., a percentage(s) of a period of time that the matchmaker shard(s) 144 spent executing the matchmaker algorithm to assign a subset(s) of players 112 to matches of the game) violates (e.g., is greater than or equal to, or is strictly greater than) a first threshold percentage (80%, 90%, etc.). If the first threshold percentage is violated at block 904 for all shards 144 (i.e., if no shards 144 report an algorithm utilization metric that does not violate the first threshold percentage, the process 900 may follow the "YES" route from block 904 to block 902 without decreasing the shard count 146. If the first threshold percentage is not violated at block 904 for any shard (i.e., if any shard 144 reports an algorithm utilization metric that does not violate the first threshold percentage), the process 900 may follow the "NO" route from block 904 to block 906.

At 906, the computing device(s) of a service provider network 102 may tag the matchmaker shard(s) 144 that reported metrics that are not in violation of the first threshold with a tag. This tag may be a "down-sharding" tag that is to be used to determine whether to decrease the shard count 146, as described herein.

At 908, the computing device(s) of a service provider network 102 may determine a percentage of the number of matchmaker shards 144 tagged with the tag. For example, if five out of ten active shards 144 are tagged with the down-sharding tag, the percentage determined at block 908 is 50%.

At 910, the computing device(s) of a service provider network 102 may determine whether the percentage of shards tagged with the tag violates (e.g., is greater than or equal to, is strictly greater than, etc.) a second threshold percentage (e.g., 20%, 30%, 50%, etc.). In some embodiments, the second threshold percentage evaluated at block 910 is a threshold of 100%, meaning that the shard count 146 would not be decreased unless all of the shards 144 are underloaded (i.e., tagged with the down-sharding tag). If the second threshold percentage is violated at block 910, the process 900 may follow the "YES" route from block 910 to block 912.

At 912, the shard count 146 may be decreased, as described herein. At sub-block 914, the decreasing of the shard count 146 may include determining a number to which the shard count is to be decreased, and decreasing the shard count 146 to that number (e.g., decreasing by a number greater than one). The determination of the number (e.g., the amount of the decrease) may be based at least in part on the percentage of total shards 144 that are tagged for down-sharding. For example, if 10% of the shards 144 are tagged for down-sharding, the shard count 146 may be decreased to a first number, and if 90% of the shards 144 are tagged for down-sharding, the shard count 146 may be decreased by a second number greater than the first number.

At 916, the down-sharding tags on the active shards 144 may be cleared such that none of the active shards are tagged with the down-sharding tag anymore. If, at block 910, the second threshold percentage is not violated, the process 900 may follow the "NO" route from block 910 to block 916 in order to clear the tags without decreasing the shard count 146.

Figure 10:
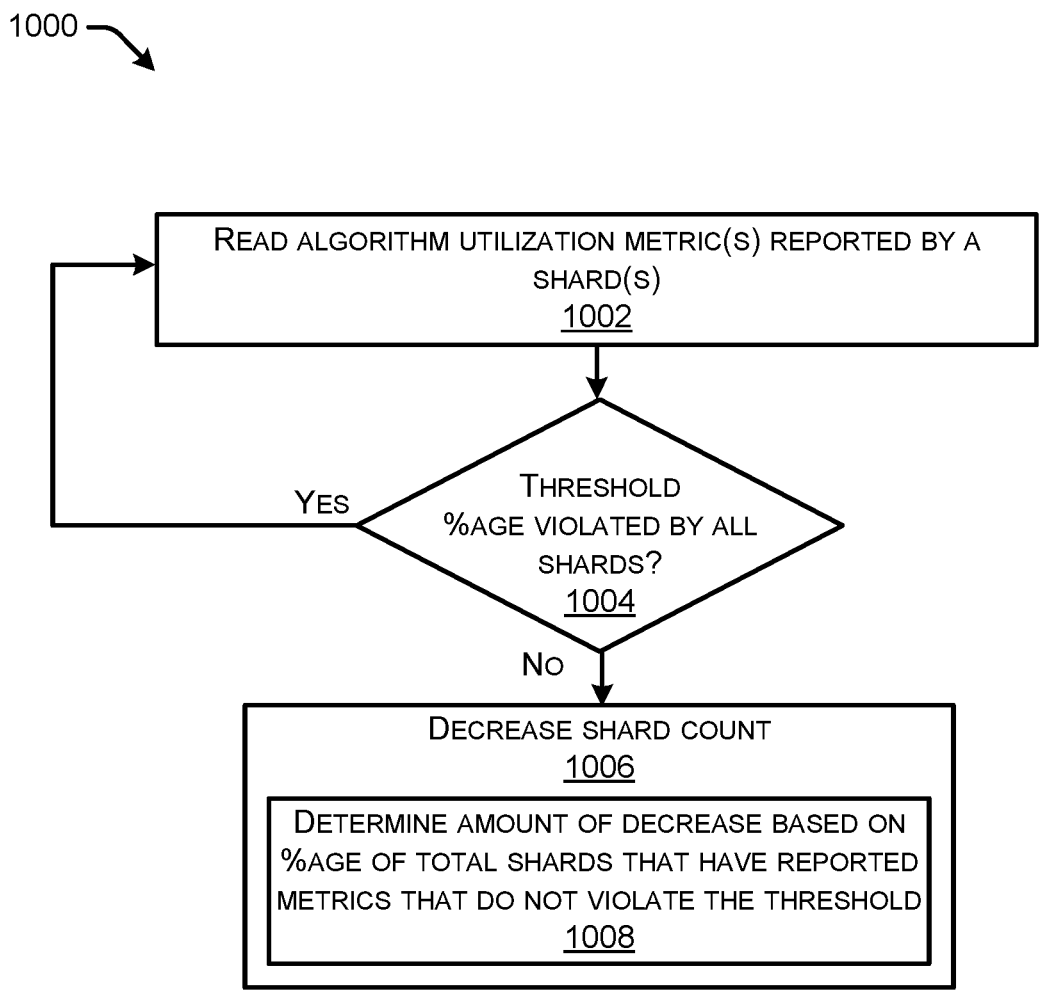
FIG. 10 illustrates a flow diagram of an example process for determining whether to decrease the shard count based on an algorithm utilization metric(s) using a threshold.

FIG. 10 illustrates a flow diagram of an example process 1000 for determining whether to decrease the shard count 146 based on an algorithm utilization metric(s). For discussion purposes, the process 1000 is described with reference to the previous figures.

At 1002, a computing device(s) of a service provider network 102 may read an algorithm utilization metric(s) 156 reported by a current number of matchmaker shards 144, as described herein. The number of algorithm utilization metrics read depends on the current number of matchmaker shards 144. For example, if the current shard count 146 is set to two shards 144, two algorithm utilization metrics may be read at block 1002. If the current shard count 146 is set to three shards 144, three algorithm utilization metrics may be read at block 1002, and so on.

At 1004, the computing device(s) of a service provider network 102 may determine whether the algorithm utilization metric(s) read at block 1002 (e.g., a percentage(s) of a period of time that the matchmaker shard(s) 144 spent executing the matchmaker algorithm to assign a subset(s) of players 112 to matches of the game) violates (e.g., is greater than or equal to, or is strictly greater than) a threshold percentage (80%, 90%, etc.). If the threshold percentage is not violated at block 1004 for any shard (i.e., if any shard 144 reports an algorithm utilization metric that does not violate the threshold percentage), the process 1000 may follow the "NO" route from block 1004 to block 1006.

At 1006, the shard count 146 may be decreased, as described herein. At sub-block 1008, the decreasing of the shard count 146 may include determining a number to which the shard count is to be decreased, and decreasing the shard count 146 to that number (e.g., decreasing by a number greater than one). The determination of the number (e.g., the amount of the decrease) may be based at least in part on the percentage of total shards 144 that have reported metrics (e.g., algorithm utilization metrics) that do not violate the threshold at block 1004. For example, if 10% of the shards 144 report algorithm utilization metrics that do not violate the threshold percentage at block 1004, the shard count 146 may be decreased to a first number, and if 90% of the shards 144 report algorithm utilization metrics that do not violate the threshold percentage at block 1004, the shard count 146 may be decreased by a second number greater than the first number. If, at block 1004, the threshold percentage is violated for all shards 144 (i.e., if no shards 144 report an algorithm utilization metric that does not violate the first threshold percentage), the process 1000 may follow the "YES" route from block 1004 to block 1002 without decreasing the shard count 146.

Figure 11:
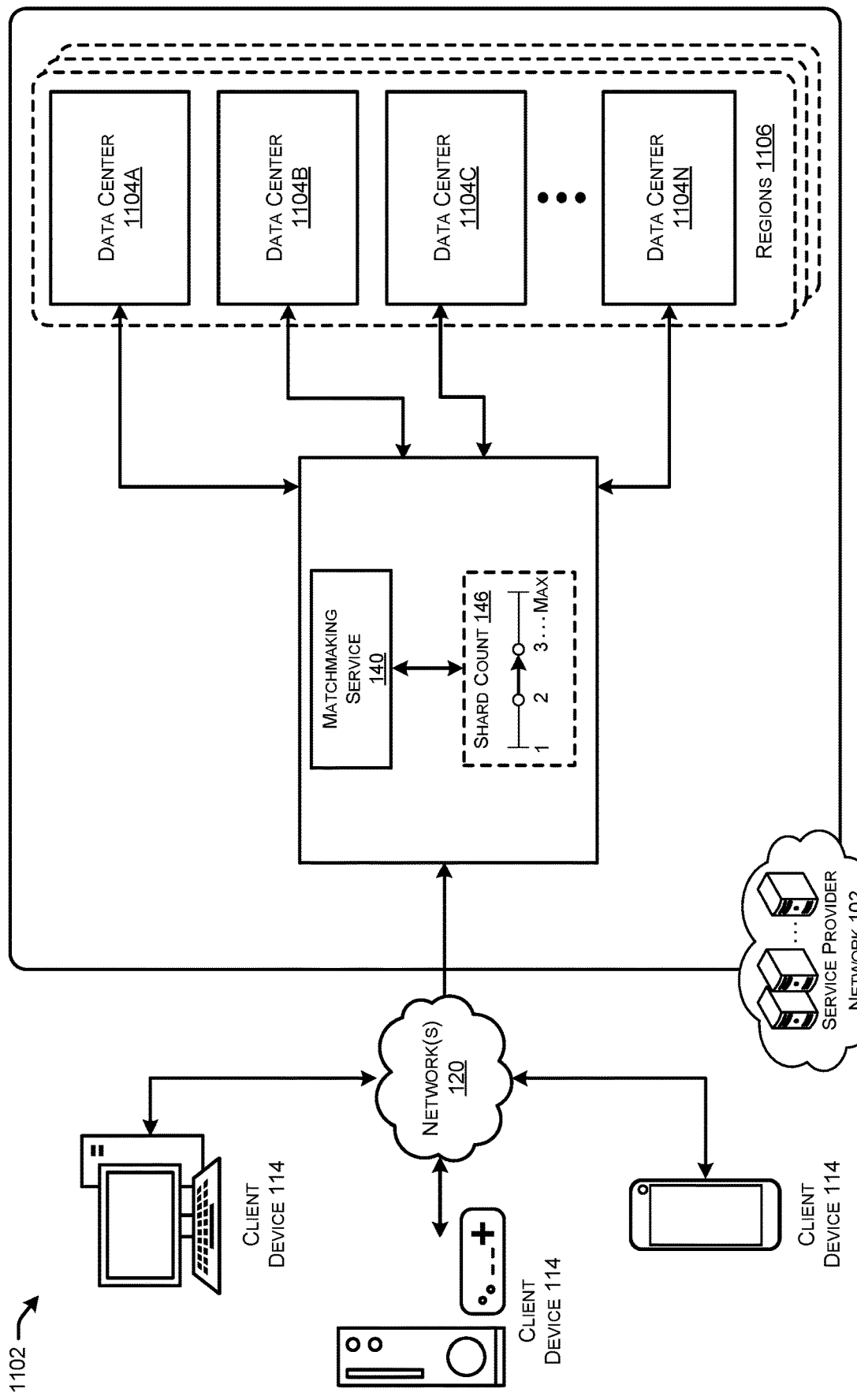
FIG. 11 is a system and network diagram that shows an illustrative operating environment that includes a service provider network that can be configured to implement aspects of the functionality described herein.

FIG. 11 is a system and network diagram that shows an illustrative operating environment 1102 that includes a service provider network 102 that can be configured to implement aspects of the functionality described herein. The service provider network 102 can provide computing resources, like VM instances and storage, on a permanent or an as-needed basis. Among other types of functionality, the computing resources 124/154 provided by the service provider network 102 may be utilized to implement the various services described above. As also discussed above, the computing resources provided by the service provider network 102 can include various types of computing resources, such as data processing resources like VM instances, data storage resources, networking resources, data communication resources, network services, and the like.

Each type of computing resource provided by the service provider network 102 can be general-purpose or can be available in a number of specific configurations. For example, data processing resources can be available as physical computers or VM instances in a number of different configurations. The VM instances can be configured to execute applications, including web servers, application servers, media servers, database servers, gaming applications, some or all of the network services described above, and/or other types of programs. Data storage resources can include file storage devices, block storage devices, and the like. The service provider network 102 can also be configured to provide other types of computing resources not mentioned specifically herein.

The computing resources provided by the service provider network 102 may be enabled in one embodiment by one or more data centers 1104A-1104N (which might be referred to herein singularly as "a data center 1104" or in the plural as "the data centers 1104"). The data centers 1104 are facilities utilized to house and operate computer systems and associated components. The data centers 1104 typically include redundant and backup power, communications, cooling, and security systems. The data centers 1104 can also be located in geographically disparate locations, or regions 1106. One illustrative embodiment for a data center 1104 that can be utilized to implement the technologies disclosed herein will be described below with regard to FIG. 12.

The players 112 and subscribers 108 that utilize the service provider network 102 may access the computing resources provided by the service provider network 102 over any wired and/or wireless network(s) 120, which can be a wide area communication network ("WAN"), such as the Internet, an intranet or an Internet service provider ("ISP") network or a combination of such networks. For example, and without limitation, a client device 114 operated by a player 112 of the service provider network 102 may be utilized to access the service provider network 102 by way of the network(s) 120. It should be appreciated that a local-area network ("LAN"), the Internet, or any other networking topology known in the art that connects the data centers 1104 to remote clients and other users can be utilized. It should also be appreciated that combinations of such networks can also be utilized. The network interfaces of computing devices of the data center 1104 may include devices configured to couple to PANs, wired and wireless LANs, wired and wireless WANs, and so forth. For example, the network interfaces may include devices compatible with Ethernet, Wi-Fi™, and so forth. As illustrated, a matchmaking service 140 may be configured to dynamically adjust a shard count 146 so that a given matchmaker (e.g., matchmaking software) of a subscriber 108 can be implemented as a number of matchmaker shards 144 equal to the shard count 146. In this manner, shards 144 may be deployed and/or decommissioned dynamically at runtime to provide a balance of adequate resources for placing players 112 into matches within a below-threshold amount of time, without portioning the player population more than is necessary to ensure that adequate resources are available.

Figure 12:
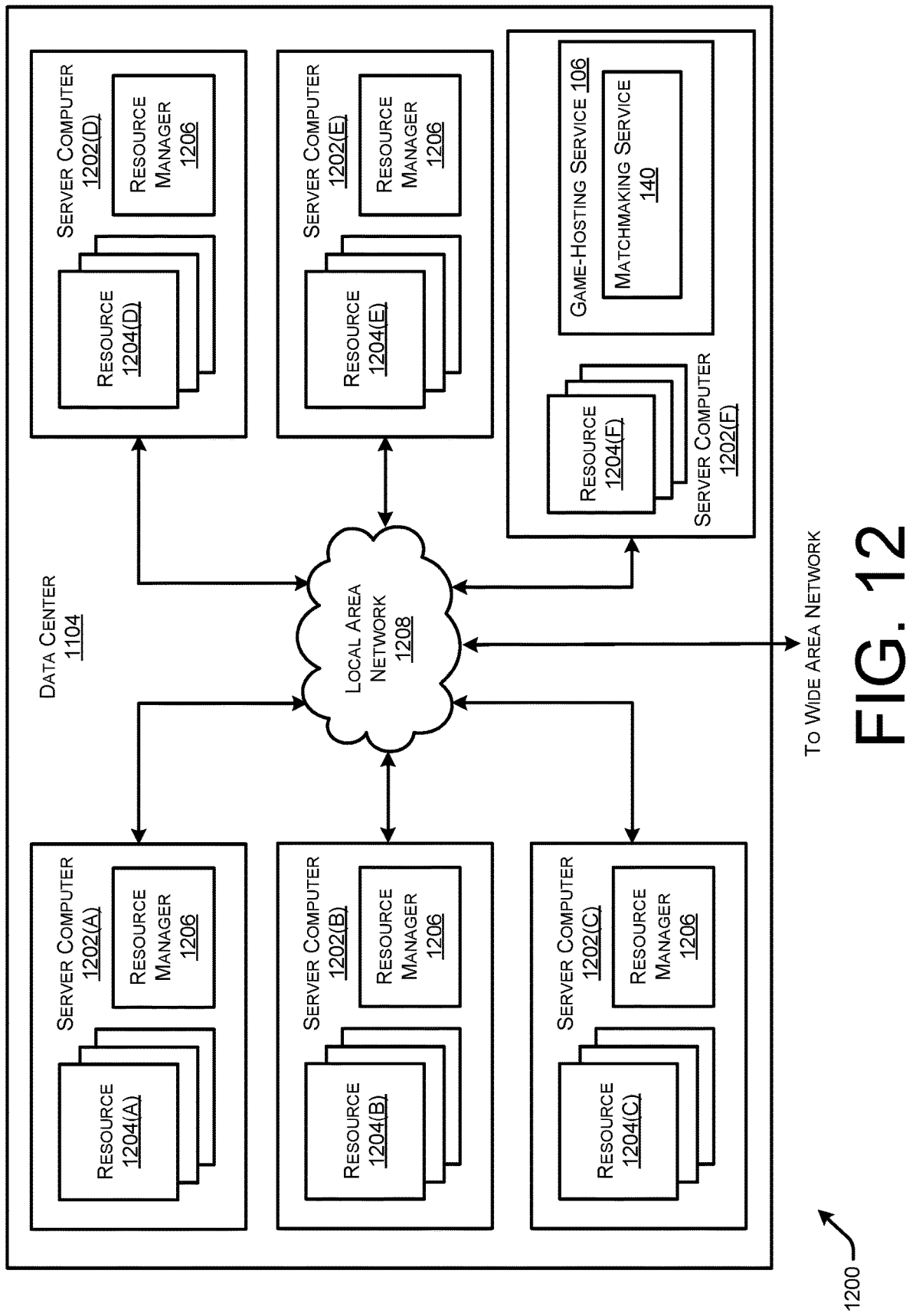
FIG. 12 is a computing system diagram illustrating a configuration for a data center that can be utilized to implement aspects of the technologies disclosed herein.

FIG. 12 is a computing system diagram 1200 that illustrates one configuration for a data center 1104 that implements aspects of the technologies disclosed herein. The example data center 1104 shown in FIG. 12 includes several server computers 1202A-1202F (which might be referred to herein singularly as "a server computer 1202" or in the plural as "the server computers 1202") for providing computing resources 1204A-1204E. In some examples, the resources 1204 and/or server computers 1202 may include, be included in, or correspond to, the computing resource network 124/154 described herein.

The server computers 1202 can be standard tower, rackmount, or blade server computers configured appropriately for providing the computing resources described herein (illustrated in FIG. 12 as the computing resources 1204A-1204E). As mentioned above, the computing resources provided by the service provider network 102 can be data processing resources such as VM instances or hardware computing systems, database clusters, computing clusters, storage clusters, data storage resources, database resources, networking resources, and others. Some of the servers 1202 can also be configured to execute a resource manager 1206 capable of instantiating and/or managing the computing resources. In the case of VM instances, for example, the resource manager 1206 can be a hypervisor or another type of program configured to enable the execution of multiple VM instances on a single server computer 1202. Server computers 1202 in the data center 1104 can also be configured to provide network services and other types of services. In some embodiments, the server computers 1202 may represent the host computers 152 and/or the game servers 122 of FIG. 1.

In the example data center 1104 shown in FIG. 12, an appropriate LAN 1208 is also utilized to interconnect the server computers 1202A-1202F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 1104A-1104N, between each of the server computers 1202A-1202F in each data center 1104, and, potentially, between computing resources in each of the server computers 1202. It should be appreciated that the configuration of the data center 1104 described with reference to FIG. 12 is merely illustrative and that other implementations can be utilized.

The data center 1104 shown in FIG. 12 also includes a server computer 1202F that can execute some or all of the software components described above. For example, and without limitation, the server computer 1202F (and the other server computers 1202) can generally correspond to a server configured to execute components of the game-hosting service 106 including, without limitation, the matchmaking service 140, and/or the other software components described above. The server computer 1202F can also be configured to execute other components and/or to store data for providing some or all of the functionality described herein. In this regard, it should be appreciated that the services illustrated in FIG. 12 as executing on the server computer 1202F can execute on many other physical or virtual servers in the data centers 1104 in various embodiments. Thus, the data center 1104 in FIG. 12 may also include a plurality of server computers 1202 that execute a fleet of VM instances 126/150, which are executing processes to host game sessions for online games and/or matchmaker shards 144, as described herein.

Figure 13:
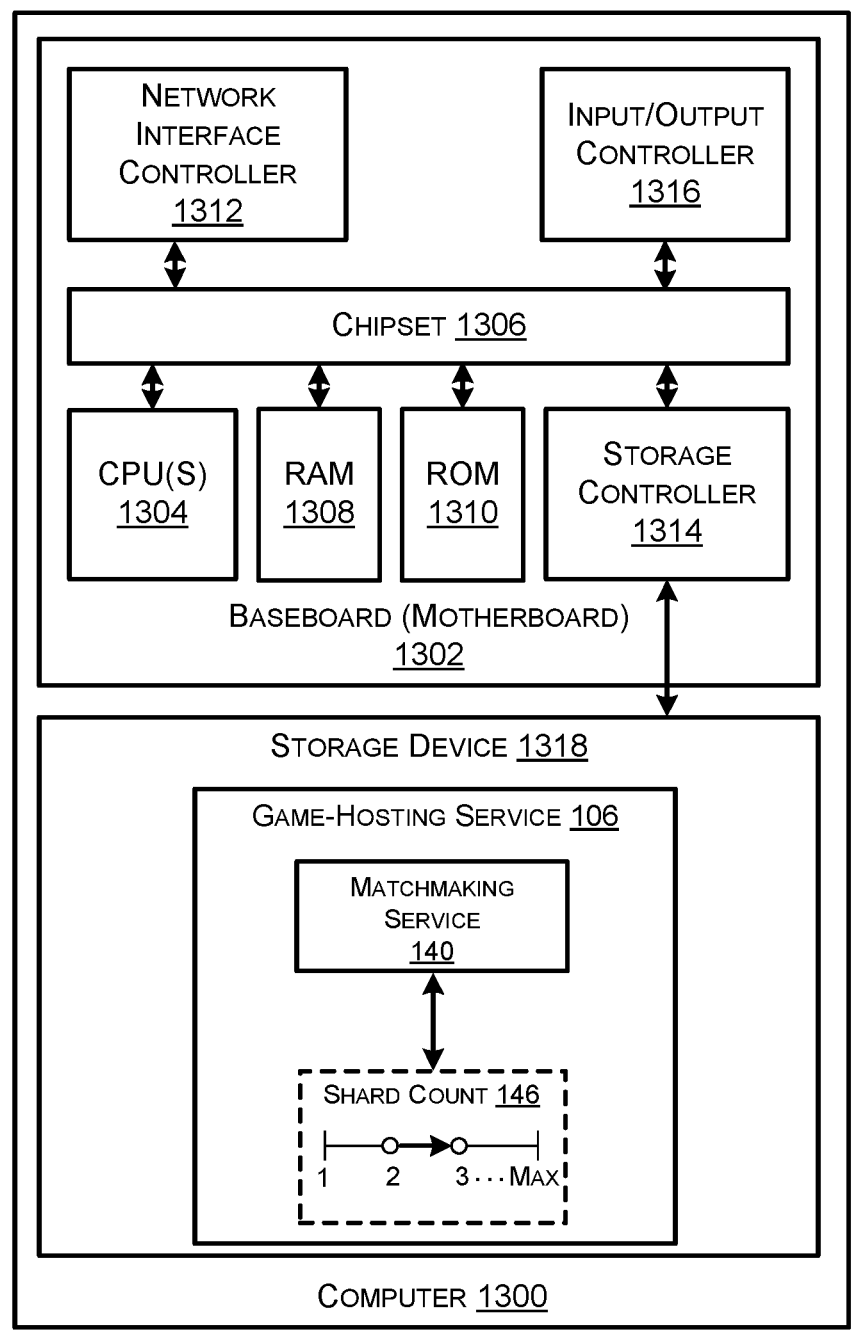
FIG. 13 is a computer architecture diagram showing an illustrative computer hardware architecture for implementing a computing device that can be utilized to implement aspects of the various technologies presented herein.

FIG. 13 shows an example computer architecture for a computer 1300 (or computing device) capable of executing program components for implementing the functionality described above. The computer architecture shown in FIG. 13 illustrates a server computer, workstation, desktop computer, laptop, tablet, network appliance, e-reader, smartphone, or other computing device, and can be utilized to execute any of the software components presented herein. In some examples, the server computer 1300 may correspond to one or more computing devices that implements the game-hosting service 106 described in FIG. 1.

The computer 1300 includes a baseboard 1302, or "motherboard," which is a printed circuit board to which a multitude of components or devices can be connected by way of a system bus or other electrical communication paths. In one illustrative configuration, one or more central processing units ("CPUs") 1304 operate in conjunction with a chipset 1306. The CPUs 1304 can be standard programmable processors that perform arithmetic and logical operations necessary for the operation of the computer 1300. The CPUs 1304 may represent hardware processor(s) that comprise one or more cores and configured to execute one or more stored instructions.

The CPUs 1304 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1306 provides an interface between the CPUs 1304 and the remainder of the components and devices on the baseboard 1302. The chipset 1306 can provide an interface to a RAM 1308, used as the main memory in the computer 1300. The chipset 1306 can further provide an interface to a computer-readable storage medium such as a read-only memory ("ROM") 1310 or non-volatile RAM ("NVRAM") for storing basic routines that help to startup the computer 1300 and to transfer information between the various components and devices. The ROM 1310 or NVRAM can also store other software components necessary for the operation of the computer 1300 in accordance with the configurations described herein.

The computer 1300 can operate in a networked environment using logical connections to remote computing devices and computer systems through a network, such as the network 1208. The chipset 1306 can include functionality for providing network connectivity through a NIC 1312, such as a gigabit Ethernet adapter. The NIC 1312 is capable of connecting the computer 1300 to other computing devices (e.g., subscriber device(s) 110 and/or the client device(s) 114) over the network 1208 (or 120). It should be appreciated that multiple NICs 1312 can be present in the computer 1300, connecting the computer to other types of networks and remote computer systems.

The computer 1300 can be connected to a mass storage device 1318 that provides non-volatile storage for the computer. The mass storage device 1318 can store one or more operating systems utilized to control the operation of the one or more devices that comprise the service provider network 102. According to one embodiment, the operating system comprises the LINUX operating system. According to another embodiment, the operating system(s) comprise the WINDOWS® SERVER operating system from MICROSOFT Corporation of Redmond, Wash. According to further embodiments, the operating system(s) can comprise the UNIX operating system or one of its variants. It should be appreciated that other operating systems can also be utilized. The mass storage device 1318 may also store various executable components (e.g., software-based components, firmware-based components, etc.), programs, and data, which have been described in greater detail herein, such as the matchmaking service 140 configured to dynamically adjust the shard count 146 for a given matchmaker (e.g., matchmaking software) of a subscriber 108. The mass storage device 1318 can be connected to the computer 1300 through a storage controller 1314 connected to the chipset 1306. The mass storage device 1318 can consist of one or more physical storage units. The storage controller 1314 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1300 can store data on the mass storage device 1318 by transforming the physical state of the physical storage units to reflect the information being stored. The specific transformation of physical state can depend on various factors, in different embodiments of this description. Examples of such factors can include, but are not limited to, the technology used to implement the physical storage units, whether the mass storage device 1318 is characterized as primary or secondary storage, and the like.

For example, the computer 1300 can store information to the mass storage device 1318 by issuing instructions through the storage controller 1314 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1300 can further read information from the mass storage device 1318 by detecting the physical states or characteristics of one or more particular locations within the physical storage units.

In addition to the mass storage device 1318 described above, the computer 1300 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1300. In some examples, the operations performed by the network-based service platform 102, and or any components included therein, may be supported by one or more devices similar to computer 1300. Stated otherwise, some or all of the operations performed by the service provider network 102, and or any components included therein, may be performed by one or more computer devices 1300 operating in a network-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion. The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. The mass storage device 1318 can store other system or application programs and data utilized by the computer 1300.

In one embodiment, the mass storage device 1318 or other computer-readable storage media is encoded with computer-executable instructions which, when loaded into the computer 1300, transform the computer from a general-purpose computing system into a special-purpose computer capable of implementing the embodiments described herein. These computer-executable instructions transform the computer 1300 by specifying how the CPUs 1304 transition between states, as described above. According to one embodiment, the computer 1300 has access to computer-readable storage media storing computer-executable instructions which, when executed by the computer 1300, perform the various processes described above with regard to FIGS. 1-10. The computer 1300 can also include computer-readable storage media having instructions stored thereupon for performing any of the other computer-implemented operations described herein.

The computer 1300 can also include one or more input/output controllers 1316 for receiving and processing input from a number of input devices, such as a keyboard, a mouse, a touchpad, a touch screen, an electronic stylus, or other type of input device. Similarly, an input/output controller 1316 can provide output to a display, such as a computer monitor, a flat-panel display, a digital projector, a printer, or other type of output device. It will be appreciated that the computer 1300 might not include all of the components shown in FIG. 13, can include other components that are not explicitly shown in FIG. 13, or might utilize an architecture completely different than that shown in FIG. 13.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
    initializing a shard count associated with a subscriber of a service provider network at a minimum number equal to one shard, wherein the shard count indicates a current number of matchmaker shards used for assigning players to matches of a game associated with the subscriber;
    executing, by one or more computing devices of a game-hosting service associated with the service provider network, a first matchmaker shard on a first virtual machine (VM) instance of a first host computer;
    during a reporting interval for the first matchmaker shard:
        queuing incoming matchmaking requests associated with a plurality of players of the game as queued matchmaking requests; and
        periodically executing, using the first matchmaker shard, a matchmaker algorithm to assign the plurality of players to matches of the game;
    at an end of the reporting interval:
        determining a metric associated with the queued matchmaking requests, the metric indicating whether the first matchmaker shard is overloaded; and
        reporting the metric to a data store;
    querying the data store after multiple reporting intervals have transpired to read multiple metrics reported by the first matchmaker shard over a predetermined period of time;
    determining that a value based on the multiple metrics indicates the first matchmaker shard is overloaded;
    increasing the shard count from the minimum number to a second number greater than the minimum number; and
    executing, by the one or more computing devices:
        the first matchmaker shard on the first VM instance of the first host computer; and
        a second matchmaker shard on a second VM instance of a second host computer.

2. The method of claim 1, further comprising, after the increasing of the shard count, and during a subsequent reporting interval for the first matchmaker shard and the second matchmaker shard:
    queuing, for the first matchmaker shard, a first subset of additional incoming matchmaking requests associated with a first subset of an additional plurality of players of the game;
    periodically executing, using the first matchmaker shard, the matchmaker algorithm to assign the first subset of the additional plurality of players to the matches or to new matches of the game;
    queuing, for the second matchmaker shard, a second subset of the additional incoming matchmaking requests associated with a second subset of the additional plurality of players; and
    periodically executing, using the second matchmaker shard, the matchmaker algorithm to assign the second subset of the additional plurality of players to the matches or to the new matches.

3. The method of claim 2, further comprising:
    at an end of the subsequent reporting interval:
        determining a second metric indicating whether the first matchmaker shard is underloaded;
        reporting the second metric to the data store;
        determining a third metric indicating whether the second matchmaker shard is underloaded; and
        reporting the third metric to the data store;
    querying the data store to read the second metric and the third metric;
    determining that at least one of the second metric indicates that the first matchmaker shard is underloaded or the third metric indicates that the second matchmaker shard is underloaded;
    tagging at least one of the first matchmaker shard or the second matchmaker shard with a tag;
    determining that a percentage of the second number of matchmaker shards tagged with the tag violates a threshold percentage; and
    decreasing the shard count from the second number to the minimum number.

4. A method comprising:
    executing, by one or more computing devices of a service provider network, a first number of matchmaker shards on one or more virtual machine (VM) instances allocated to a subscriber of the service provider network, wherein the first number of matchmaker shards includes at least a first matchmaker shard executing on a first VM instance of a first host computer;
    determining a metric associated with queued matchmaking requests associated with a plurality of players of a game associated with the subscriber, the metric indicating whether one or more matchmaker shards of the first number of matchmaker shards are overloaded;
    based at least in part on the metric, increasing a shard count associated with the subscriber from the first number to a second number greater than the first number; and
    executing, by the one or more computing devices, the second number of matchmaker shards on the one or more VM instances allocated to the subscriber, wherein the second number of matchmaker shards includes at least the first matchmaker shard executing on the first VM instance and a second matchmaker shard executing on at least one of the first VM instance, a second VM instance of the first host computer, or a third VM instance of a second host computer.

5. The method of claim 4, wherein the metric comprises a maximum wait time associated with the queued matchmaking requests, an individual wait time computed as a time between a first time at which a matchmaking request was queued and a second time at which a matchmaker shard started executing a matchmaker algorithm to assign a player associated with the matchmaking request to a match of the game.

6. The method of claim 5, wherein the increasing of the shard count based at least in part on the metric comprises:
   determining that the maximum wait time violates a threshold wait time; and
   increasing the shard count based at least in part on the maximum wait time violating the threshold wait time.

7. The method of claim 5, wherein the increasing of the shard count based at least in part on the metric comprises:
   determining multiple maximum wait times reported by the first matchmaker shard over a predetermined period of time, the multiple maximum wait times including the maximum wait time;
   determining that a value based on the multiple maximum wait times violates a threshold wait time; and
   increasing the shard count based at least in part on the value violating the threshold wait time.

8. The method of claim 5, wherein the maximum wait time was reported by the first matchmaker shard, and wherein the increasing of the shard count based at least in part on the metric comprises:
   determining that the maximum wait time violates a threshold wait time;
   tagging the first matchmaker shard with a tag;
   determining that a percentage of the first number of matchmaker shards tagged with the tag violates a threshold percentage; and
   increasing the shard count based at least in part on the percentage violating the threshold percentage.

9. The method of claim 4, further comprising, prior to the increasing of the shard count, determining the second number to which the shard count is to be increased.

10. The method of claim 4, further comprising, after the increasing of the shard count:
    determining a second metric associated with the first matchmaker shard;
    determining a third metric associated with the second matchmaker shard;
    based at least in part on at least one of the second metric or the third metric, decreasing the shard count from the second number to the first number; and
    executing, by the one or more computing devices, the first number of matchmaker shards on the one or more VM instances allocated to the subscriber.

11. The method of claim 10, wherein:
    the second metric comprises a first percentage of a period of time that the first matchmaker shard spent executing a matchmaker algorithm to assign a first subset of an additional plurality of players to matches of the game; and
    the third metric comprises a second percentage of the period of time that the second matchmaker shard spent executing the matchmaker algorithm to assign a second subset of the additional plurality of players to the matches.

12. The method of claim 11, wherein the decreasing of the shard count based at least in part on the at least one of the second metric or the third metric comprises:
    determining that the at least one of the first percentage or the second percentage fails to violate a threshold percentage; and
    decreasing the shard count based at least in part on the at least one of the first percentage or the second percentage failing to violate the threshold percentage.

13. The method of claim 11, wherein the decreasing of the shard count based at least in part on the at least one of the second metric or the third metric comprises:
    determining that the at least one of the first percentage or the second percentage fails to violate a first threshold percentage;
    tagging at least one of the first matchmaker shard or the second matchmaker shard with a tag;
    determining that a third percentage of the second number of matchmaker shards tagged with the tag violates a second threshold percentage; and
    decreasing the shard count based at least in part on the third percentage violating the second threshold percentage.

14. The method of claim 10, further comprising, after the decreasing of the shard count:
    decommissioning at least one of the first matchmaker shard or the second matchmaker shard as a decommissioned matchmaker shard;
    re-ingesting individual ones of additional queued matchmaking requests that were assigned to the decommissioned matchmaker shard as one or more re-ingested matchmaking requests; and
    assigning, using the first number of matchmaker shards, one or more players associated with the one or more re-ingested matchmaking requests to the matches, or to new matches of the game.

15. A system comprising:
    one or more processors; and
    non-transitory computer-readable media storing computer-executable instructions that, when executed by the one or more processors, cause the system to:
    execute a first number of matchmaker shards on one or more virtual machine (VM) instances allocated to a subscriber of a service provider network, wherein the first number of matchmaker shards are configured to assign players to matches of a game associated with the subscriber, and wherein the first number of matchmaker shards includes at least a first matchmaker shard executing on a first VM instance of a first host computer and a second matchmaker shard executing on at least one of the first VM instance, a second VM instance of the first host computer, or a third VM instance of a second host computer;
    determine a first metric that indicates whether the first matchmaker shard is underloaded;
    determine a second metric that indicates whether the second matchmaker shard is underloaded;
    based at least in part on at least one of the first metric or the second metric, decrease a shard count associated with the subscriber from the first number to a second number less than the first number; and
    execute the second number of matchmaker shards on the one or more VM instances allocated to the subscriber, wherein the second number of matchmaker shards includes at least one of the first matchmaker shard or the second matchmaker shard.

16. The system of claim 15, wherein:
    the first metric comprises a first percentage of a period of time that the first matchmaker shard spent executing a matchmaker algorithm for assigning a first subset of a plurality of players to the matches; and
    the second metric comprises a second percentage of the period of time that the second matchmaker shard spent executing the matchmaker algorithm for assigning a second subset of the plurality of players to the matches.

17. The system of claim 16, wherein decreasing the shard count based at least in part on the at least one of the first metric or the second metric comprises:

determining that the at least one of the first percentage or the second percentage fails to violate a first threshold percentage;

tagging at least one of the first matchmaker shard or the second matchmaker shard with a tag;

determining that a third percentage of the second number of matchmaker shards tagged with the tag violates a second threshold percentage; and decreasing the shard count based at least in part on the third percentage violating the second threshold percentage.

18. The system of claim 15, wherein the computer-executable instructions, when executed by the one or more processors, further cause the system to, after decreasing the shard count:

determine a third metric associated with queued matchmaking requests, the third metric indicating whether one or more matchmaker shards of the second number of matchmaker shards are overloaded;

based at least in part on the third metric, increase the shard count from the second number to the first number; and execute the first number of matchmaker shards on the one or more VM instances allocated to the subscriber.

19. The system of claim 18, wherein the third metric comprises a maximum wait time associated with the queued matchmaking requests, an individual wait time computed as a time between a first time at which a matchmaking request was queued and a second time at which a matchmaker shard started executing a matchmaker algorithm to assign a player associated with the matchmaking request to a match of the game.

20. The system of claim 15, wherein the computer-executable instructions, when executed by the one or more processors, further cause the system to, prior to executing the first number of matchmaker shards:

receive a request, from a subscriber device of the subscriber, to create a new matchmaker;

determine a maximum number to which the shard count is adjustable;

initialize the shard count at a minimum number of matchmaker shards; and increase the shard count from the minimum number to the first number.

* * * * *